(12) United States Patent
Drobychev et al.

(10) Patent No.: US 9,356,793 B1
(45) Date of Patent: May 31, 2016

(54) SYSTEM AND METHOD FOR MANAGING LOAD ON A DOWNSTREAM SERVER IN A DISTRIBUTED STORAGE SYSTEM

(71) Applicant: GOOGLE INC., Mountain View, CA (US)

(72) Inventors: Alexandre Drobychev, San Mateo, CA (US); Alexander Kesselman, Sunnyvale, CA (US); George Datuashvili, Cupertino, CA (US)

(73) Assignee: GOOGLE INC., Mountain View, CA (US)

( * ) Notice: Subject to any disclaimer, the term of this patent is extended or adjusted under 35 U.S.C. 154(b) by 379 days.

(21) Appl. No.: 13/761,100

(22) Filed: Feb. 6, 2013

Related U.S. Application Data

(60) Provisional application No. 61/597,043, filed on Feb. 9, 2012.

(51) Int. Cl.
*G06F 15/16* (2006.01)
*H04L 12/26* (2006.01)

(52) U.S. Cl.
CPC ................................. *H04L 12/2668* (2013.01)

(58) Field of Classification Search
CPC ............ H04L 12/2673; H04L 12/2676; H04L 12/2686; H04L 41/5019; H04L 43/045; H04L 43/062; H04L 43/067; H04L 43/0876; H04L 12/2684; H04L 43/0882; H04L 47/14; H04L 47/20; H04L 47/29; H04L 12/10; H04L 29/08
See application file for complete search history.

(56) References Cited

U.S. PATENT DOCUMENTS

| | | | | | |
|---|---|---|---|---|---|
| 4,901,277 | A | * | 2/1990 | Soloway | G06F 5/06 709/233 |
| 5,583,792 | A | * | 12/1996 | Li | H04L 12/26 340/907 |
| 6,370,572 | B1 | * | 4/2002 | Lindskog | H04Q 3/0062 709/223 |
| 7,237,034 | B2 | * | 6/2007 | Clarke | H04L 47/10 370/230 |
| 7,657,581 | B2 | * | 2/2010 | Orenstein | G06F 11/2097 705/51 |
| 7,689,708 | B1 | * | 3/2010 | Cihla | G06F 9/5027 370/230.1 |

(Continued)

OTHER PUBLICATIONS

Chang et al., Bigtable: A Distributed Storeage System for Structured Data, OSDI'06: Seventh Symposium on Operating System Design and Implementation, Seattle, WA, Nov. 2006, pp. 4, 6.*

(Continued)

*Primary Examiner* — Ario Etienne
*Assistant Examiner* — Thorne E Waugh
(74) *Attorney, Agent, or Firm* — Morgan, Lewis & Bockius LLP

(57) ABSTRACT

A system, computer-readable storage medium storing at least one program, and a computer-implemented method for managing load on a downstream server in a distributed storage system is presented. Messages received from the downstream server in response to transactions issued by the upstream server to the downstream server are monitored, where the transactions are issued to the downstream server at a rate no greater than a transaction rate limit, the transaction rate limit being based at least in part on a maximum transaction processing rate of the downstream server. The transaction rate limit is adjusted based at least in part on a number of messages that include a pushback signal received over at least one predetermined time interval, where the pushback signal indicates that a utilization rate of the downstream server has exceeded a predetermined utilization rate.

21 Claims, 17 Drawing Sheets

(56) References Cited

U.S. PATENT DOCUMENTS

| | | | | |
|---|---|---|---|---|
| 9,021,053 B2* | 4/2015 | Bernbo | ............ | G06F 17/30212 709/216 |
| 2008/0016174 A1* | 1/2008 | Schiavone | ............ | H04L 12/585 709/207 |
| 2009/0003214 A1* | 1/2009 | Vaswani | ................ | H04L 45/00 370/236 |
| 2009/0225773 A1* | 9/2009 | Winter | ........................ | 370/437 |
| 2010/0274893 A1* | 10/2010 | Abdelal | ............. | H04L 29/0602 709/224 |
| 2010/0325476 A1* | 12/2010 | Zhang | ................ | G06F 11/1662 714/4.1 |
| 2011/0196873 A1* | 8/2011 | Kesselman | ........ | G06F 17/30575 707/741 |
| 2012/0311172 A1* | 12/2012 | Branson | ............ | G06F 17/30516 709/231 |

OTHER PUBLICATIONS

Ghemawat et al., The Google File System, SOSP '03, Oct. 19-22, 2013, Bolton Landing New York, USA, Copyright 2003 ACM 1-5811-757-5/03/0010.*

Ioannidis et al., Implementing Pushback: Router-Based Defense Against DDoS Attacks, AT&T Labs Research, Feb. 2005.*

Chang et al., Bigtable: A Distributed Storage System for Structured Data, OSDI 2006, pp. 4-12.*

Chang, Bigtable: A Distributed Storage System for Structured Data, OSDI 2006, 14 pgs.

Ghemawat, The Google File System, SOSP'03, Oct. 19-22, 2003, 15 pgs.

* cited by examiner

Exemplary Server Allocation

| Task / Function | Typical Number of Servers at an Instance |
|---|---|
| Blobmaster | 10 |
| Bitpusher | 100 |
| BigTable Servers | 50 |
| File System Servers | 1000 |
| Tape Servers | 10 |
| Tape Master | 5 |
| Replication Management | 10 |
| Quorum Clock Server | 5 |

Figure 5

SYSTEM AND METHOD FOR MANAGING LOAD ON A DOWNSTREAM SERVER IN A DISTRIBUTED STORAGE SYSTEM

RELATED APPLICATIONS

This application claims priority to U.S. Provisional Patent Application No. 61/597,043 filed Feb. 9, 2012, entitled "System and Method for Managing Load on a Downstream Server in a Distributed Storage System," which application is incorporated by reference herein in its entirety.

TECHNICAL FIELD

The disclosed embodiments relate generally to managing load on a downstream server in a distributed storage system.

BACKGROUND

The enterprise computing landscape has recently undergone a fundamental shift in storage architectures in which the central-service architecture has given way to distributed storage systems. Distributed storage systems built from commodity computer systems can deliver high performance, availability, and scalability for new data-intensive applications at a fraction of cost compared to monolithic disk arrays. To unlock the full potential of distributed storage systems, data is replicated across multiple instances of the distributed storage system at different geographical locations, thereby increasing availability and reducing network distance from clients.

Replication requests are issued by upstream servers (instances) to downstream servers (instances) in the distributed storage system to create, modify, and/or delete objects in the distributed storage system based on user demand. In implementations where a global load manager identifies and schedules the replication requests, the global load manager manages the load of the downstream servers (e.g., the number of replication requests that are handled by the downstream servers) to ensure that the downstream servers are not overloaded. However, in implementations where a global load manager does not exist, the upstream servers may inadvertently overload the downstream servers.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings.

FIG. 5 illustrates a typical allocation of instance servers to various programs or processes, according to some embodiments.

DETAILED DESCRIPTION

The embodiments described herein provide techniques for managing load on a downstream server in a distributed storage system. However, before discussing techniques for storing metadata for a file in a distributed storage system, it is instructive to present an exemplary system in which these techniques may be used.

Distributed Storage System Overview

Figure 1A:
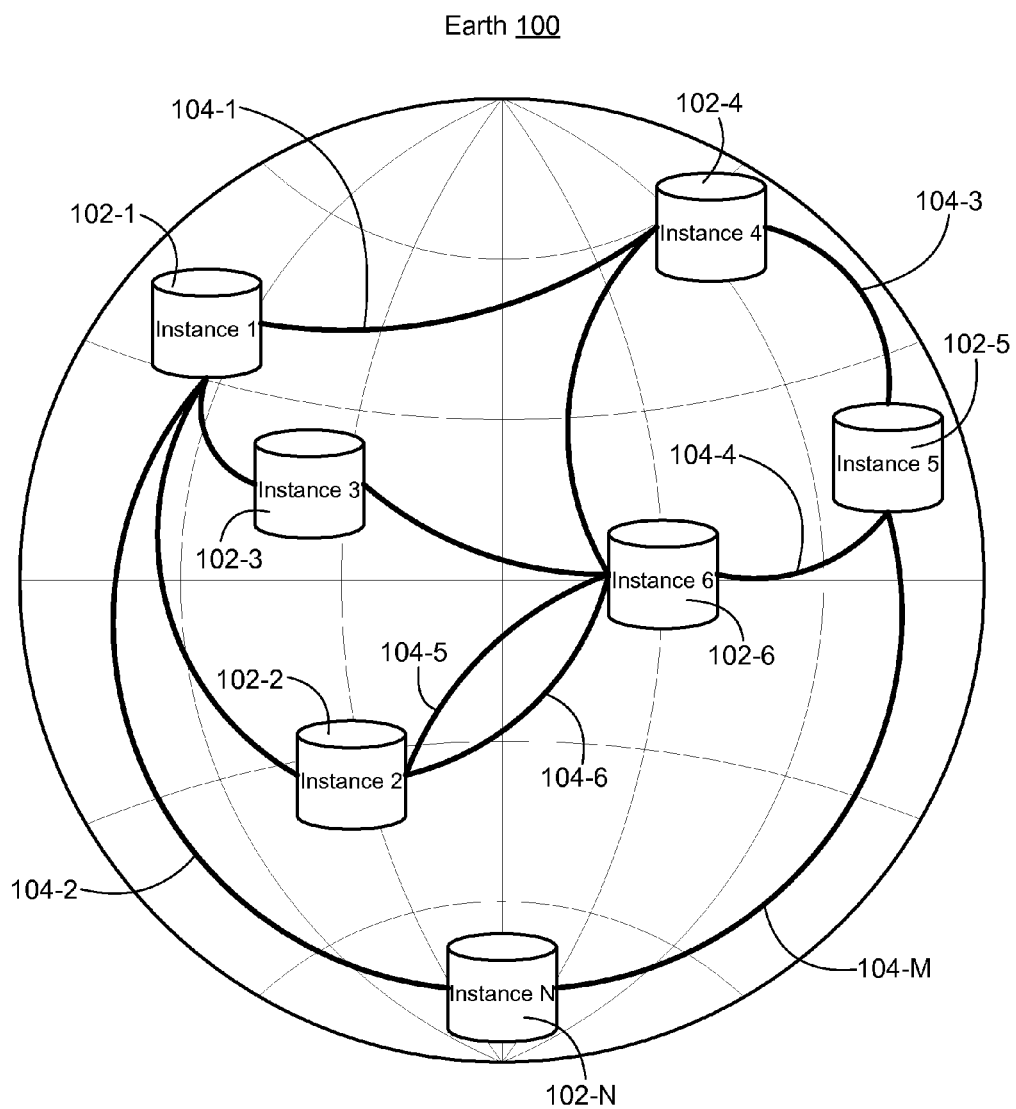
FIG. 1A is a conceptual illustration for placing multiple instances of a database at physical sites all over the globe, according to some embodiments.
Figure 2:
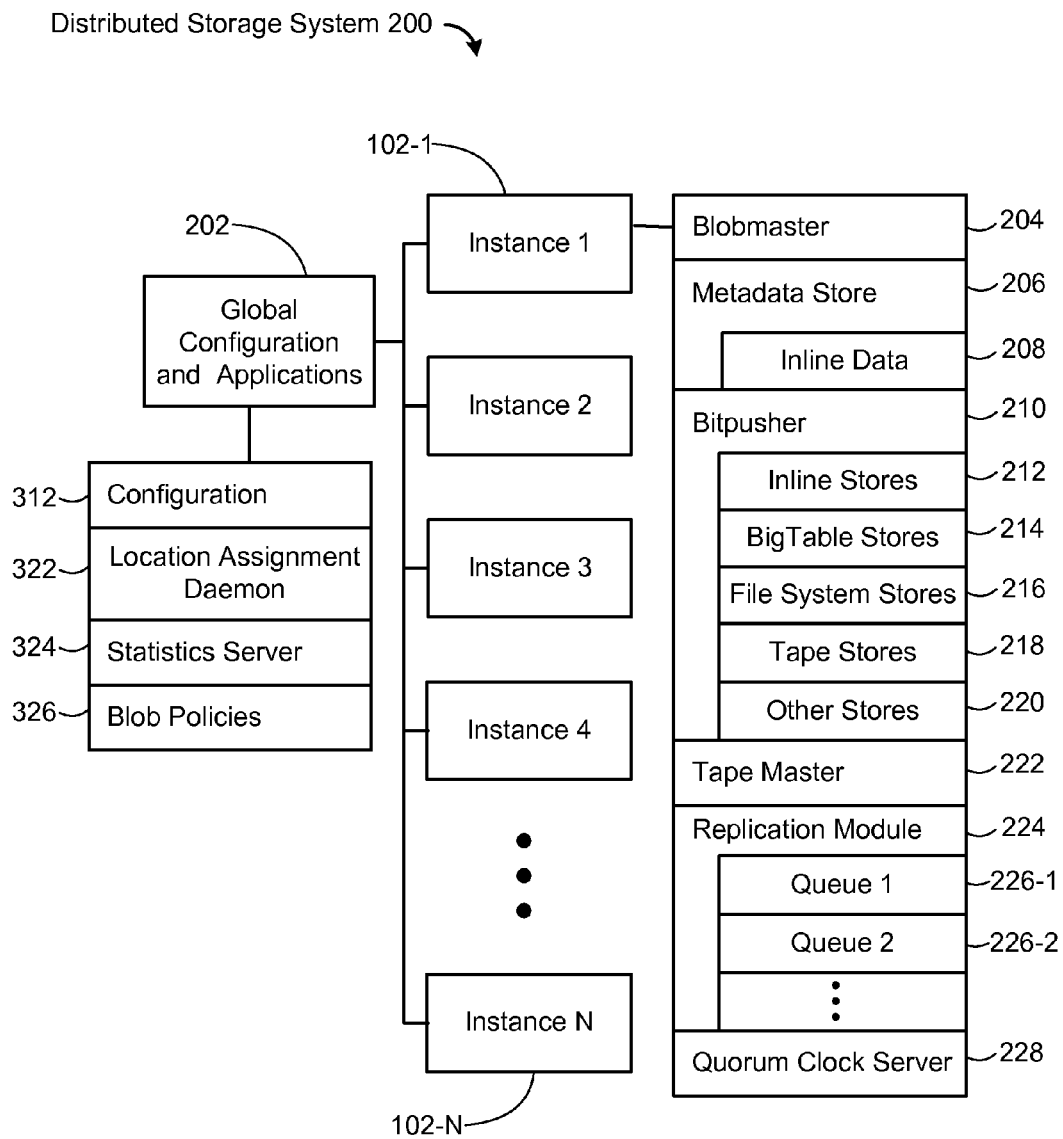
FIG. 2 is a block diagram illustrating multiple instances of a replicated database, with an exemplary set of programs and/or processes shown for the first instance according to some embodiments.
Figure 3:
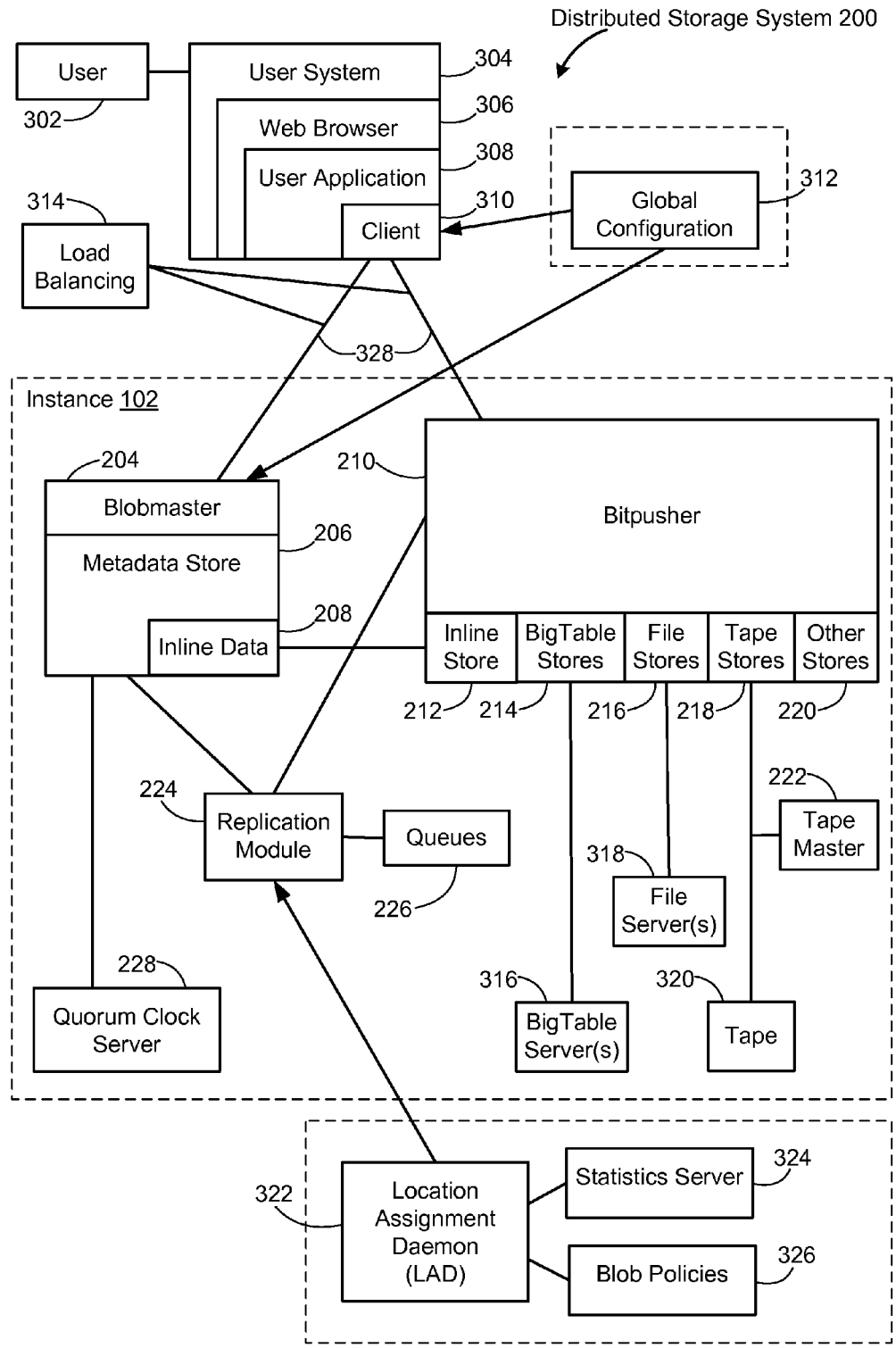
FIG. 3 is a block diagram that illustrates an exemplary instance for the system, and illustrates what blocks within the instance with which a user interacts, according to some embodiments.

The present specification describes a distributed storage system. In some embodiments, as illustrated in FIG. 1A, the distributed storage system is implemented on a global or planet-scale. In these embodiments, there is a plurality of instances 102-1, 102-2, ... 102-N at various locations on the Earth 100, connected by network communication links 104-1, 104-2, ... 104-M. In some embodiments, an instance (such as instance 102-1) corresponds to a data center. In other embodiments, multiple instances are physically located at the same data center. Although the conceptual diagram of FIG. 1A shows a limited number of network communication links 104-1, etc., typical embodiments would have many more network communication links. In some embodiments, there are two or more network communication links between the same pair of instances, as illustrated by communication links 104-5 and 104-6 between instance 2 (102-2) and instance 6 (102-6). In some embodiments, the network communication links are composed of fiber optic cable. In some embodiments, some of the network communication links use wireless technology, such as microwaves. In some embodiments, each network communication link has a specified bandwidth and/or a specified cost for the use of that bandwidth. In some embodiments, statistics are maintained about the transfer of data across one or more of the network communication links, including throughput rate, times of availability, reliability of the links, etc. Each instance typically has data stores and associated databases (as shown in FIGS. 2 and 3), and utilizes a farm of server computers ("instance servers," see FIG. 4) to perform all of the tasks. In some embodiments, there are one or more instances that have limited functionality, such as acting as a repeater for data transmissions between other instances. Limited functionality instances may or may not have any of the data stores depicted in FIGS. 3 and 4.

Figure 1B:
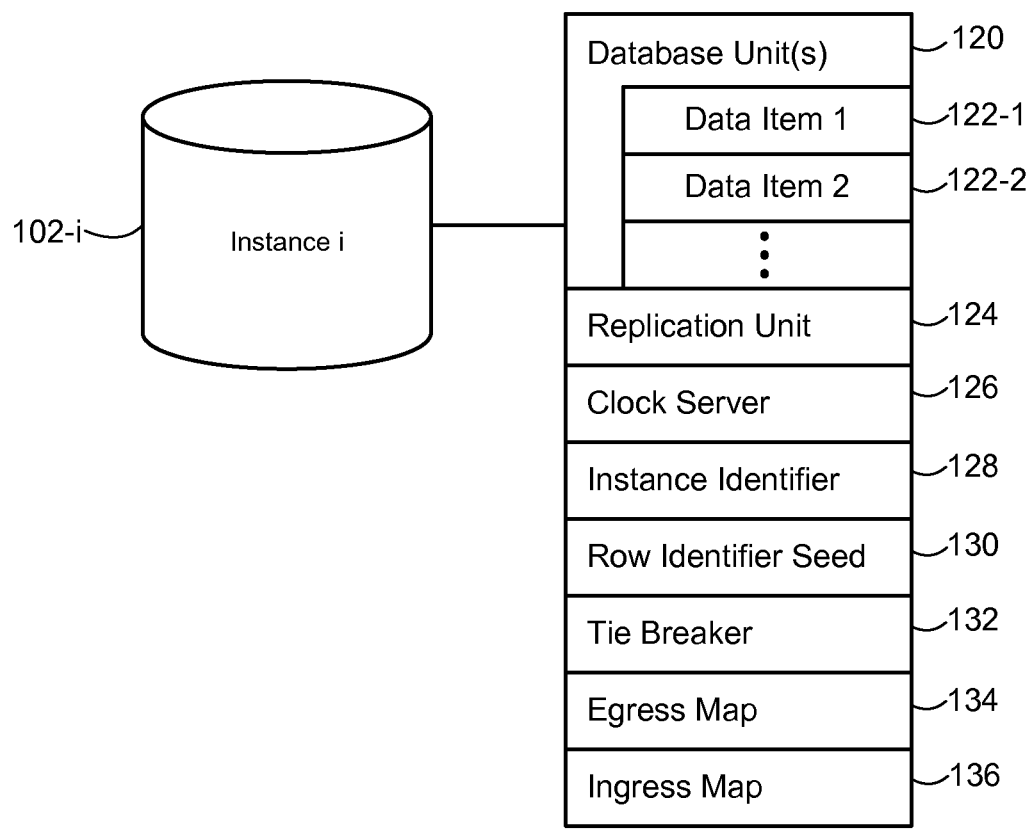
FIG. 1B illustrates basic functionality at each instance according to some embodiments.

FIG. 1B illustrates data and programs at an instance 102-*i* that store and replicate data between instances. The underlying data items 122-1, 122-2, etc. are stored and managed by one or more database units 120. Each instance 102-*i* has a replication unit 124 that replicates data to and from other instances. The replication unit 124 also manages one or more egress maps 134 that track data sent to and acknowledged by other instances. Similarly, the replication unit 124 manages one or more ingress maps, which track data received at the instance from other instances. Egress maps and ingress maps are described in more detail with respect to FIGS. 14A-14D, 15A, and 17 of U.S. patent application Ser. No. 12/703,167, "Method and System for Efficiently Replicating Data in Non-Relational Databases," filed Feb. 9, 2010, which is incorporated herein by reference in its entirety.

Each instance 102-*i* has one or more clock servers 126 that provide accurate time. In some embodiments, the clock servers 126 provide time as the number of microseconds past a well-defined point in the past. In some embodiments, the clock servers provide time readings that are guaranteed to be monotonically increasing. In some embodiments, each instance 102-*i* stores an instance identifier 128 that uniquely identifies itself within the distributed storage system. The instance identifier may be saved in any convenient format, such as a 32-bit integer, a 64-bit integer, or a fixed length character string. In some embodiments, the instance identifier is incorporated (directly or indirectly) into other unique identifiers generated at the instance. In some embodiments, an instance 102-*i* stores a row identifier seed 130, which is used when new data items 122 are inserted into the database. A row identifier is used to uniquely identify each data item 122. In some embodiments, the row identifier seed is used to create a row identifier, and simultaneously incremented, so that the next row identifier will be greater. In other embodiments, unique row identifiers are created from a timestamp provided by the clock servers 126, without the use of a row identifier seed. In some embodiments, a tie breaker value 132 is used when generating row identifiers or unique identifiers for data changes (described with respect to FIG. 6-9 of U.S. patent application Ser. No. 12/703,167, "Method and System for Efficiently Replicating Data in Non-Relational Databases," filed Feb. 9, 2010, which is incorporated herein by reference in its entirety. In some embodiments, a tie breaker value 132 is stored permanently in non-volatile memory (such as a magnetic or optical disk).

The elements described in FIG. 1B are incorporated in embodiments of the distributed storage system 200 illustrated in FIGS. 2 and 3. In some embodiments, the functionality described in FIG. 1B is included in a blobmaster 204 and metadata store 206. In these embodiments, the primary data storage (i.e., blobs) is in the inline data stores 212, the BigTable stores 214, the file system stores 216, the tape stores 218, and the other stores 220, and managed by bitpushers 210. The metadata for the blobs is in the metadata store 206, and managed by the blobmaster 204. The metadata corresponds to the functionality identified in FIG. 1B. Although the metadata for storage of blobs provides an exemplary embodiment of the present invention, one of ordinary skill in the art would recognize that the present invention is not limited to this embodiment.

In some embodiments the disclosed distributed storage system 200, the distributed storage system is used by one or more user applications 308, which are provided by application servers, such as application servers 150-1, 150-2, 150-3, 150-4, and 150-5 illustrated in FIGS. 1C-1G. Exemplary user applications that use embodiments of the disclosed distributed storage system include Gmail, YouTube, Orkut, Google Docs, and Picasa. Some embodiments of the disclosed distributed storage system simultaneously provide storage for multiple distinct user applications, and impose no limit on the number of distinct user applications that can use the distributed storage system. For example, a single implementation of the disclosed distributed storage system may provide storage services for all of the exemplary user applications listed above. In some embodiments, a user application 308 runs in a web browser 306, on a user computer system 304. A user 302 interacts with a user application 308 according to the interface provided by the user application. Each user application 308 uses a client library 310 to store and retrieve data from the distributed storage system 200.

Figure 1C:
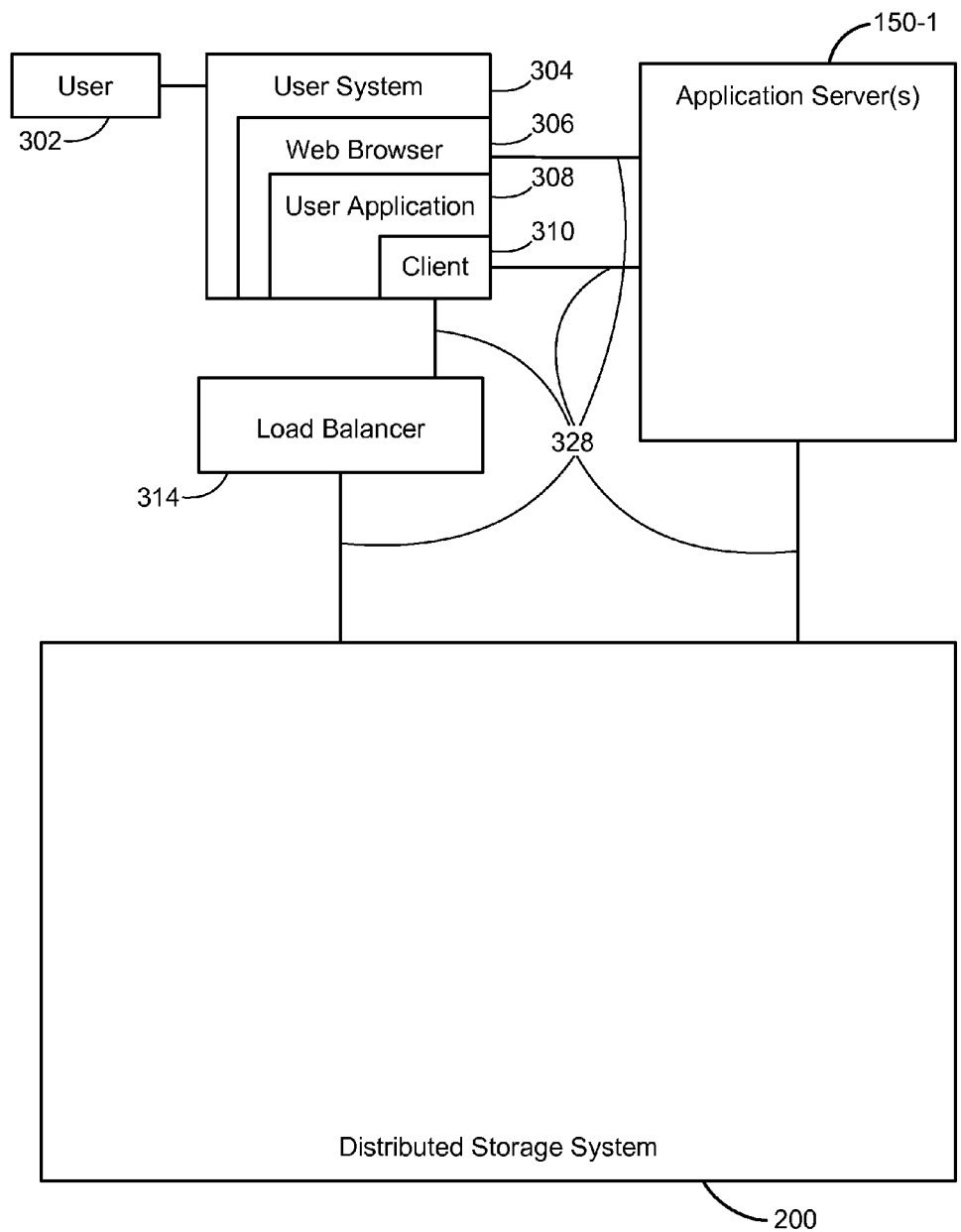
FIGS. 1C-1G illustrate ways that a distributed storage system may be integrated with systems that provide user applications according to some embodiments.

FIG. 1C illustrates an embodiment in which a user application is provided by one or more application servers 150-1. In some embodiments, the web browser 306 downloads user application 308 over a network 328 from the application servers 150-1. In addition to communication between the application server 150-1 and the user system 304, the application server(s) 150-1 communicate over network 328 with the distributed storage system 200. In particular, the application servers may establish blob policies 326 that are applicable to all data stored by the supplied user application. For example, administrators of the Gmail Application servers may establish blob policies 326 that are applicable to millions of user of Gmail.

In some embodiments, communication between the client library 310 and the distributed storage system utilizes a load balancer 314, which can distribute user requests to various instances within the distributed storage system based on various conditions, such as network traffic and usage levels at each instance. In the embodiment illustrated in FIG. 1C, the load balancer 314 is not an integrated component of the distributed storage system 200. The load balancer 314 communicates with both the client library 310 and the distributed storage system 200 over one or more networks 328. The network 328 may include the Internet, one or more local area networks (LANs), one or more wide are networks (WANs), one or more wireless networks (WiFi networks), or various combinations of these.

Figure 1D:
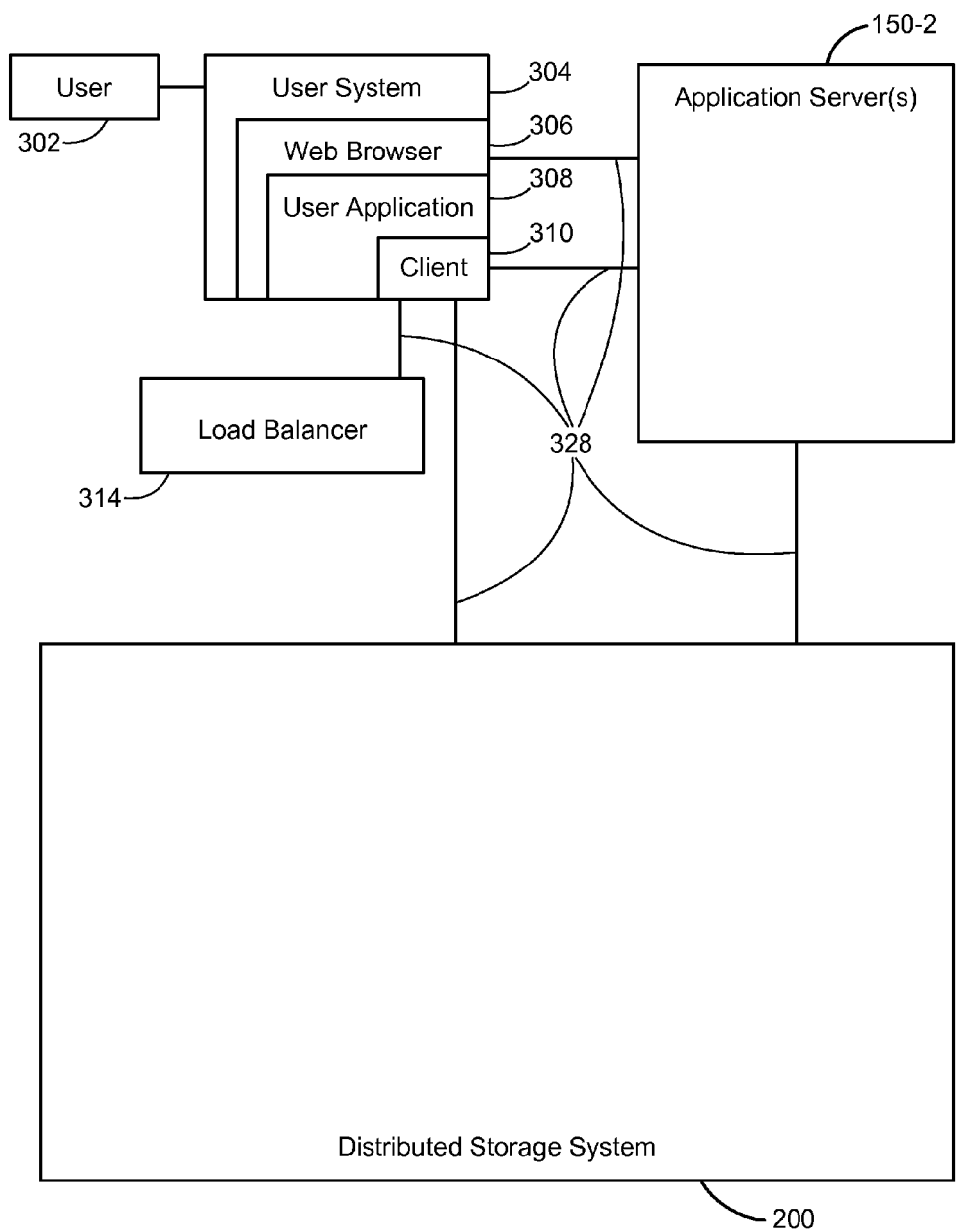

FIG. 1D illustrates an embodiment that is similar to FIG. 1C, except that the load balancer 314 just returns information to the client library 310 to specify which instance 102 within the distributed storage system 200 should be contacted. The client library 310 then contacts the appropriate instance 102 directly.

Figure 1E:
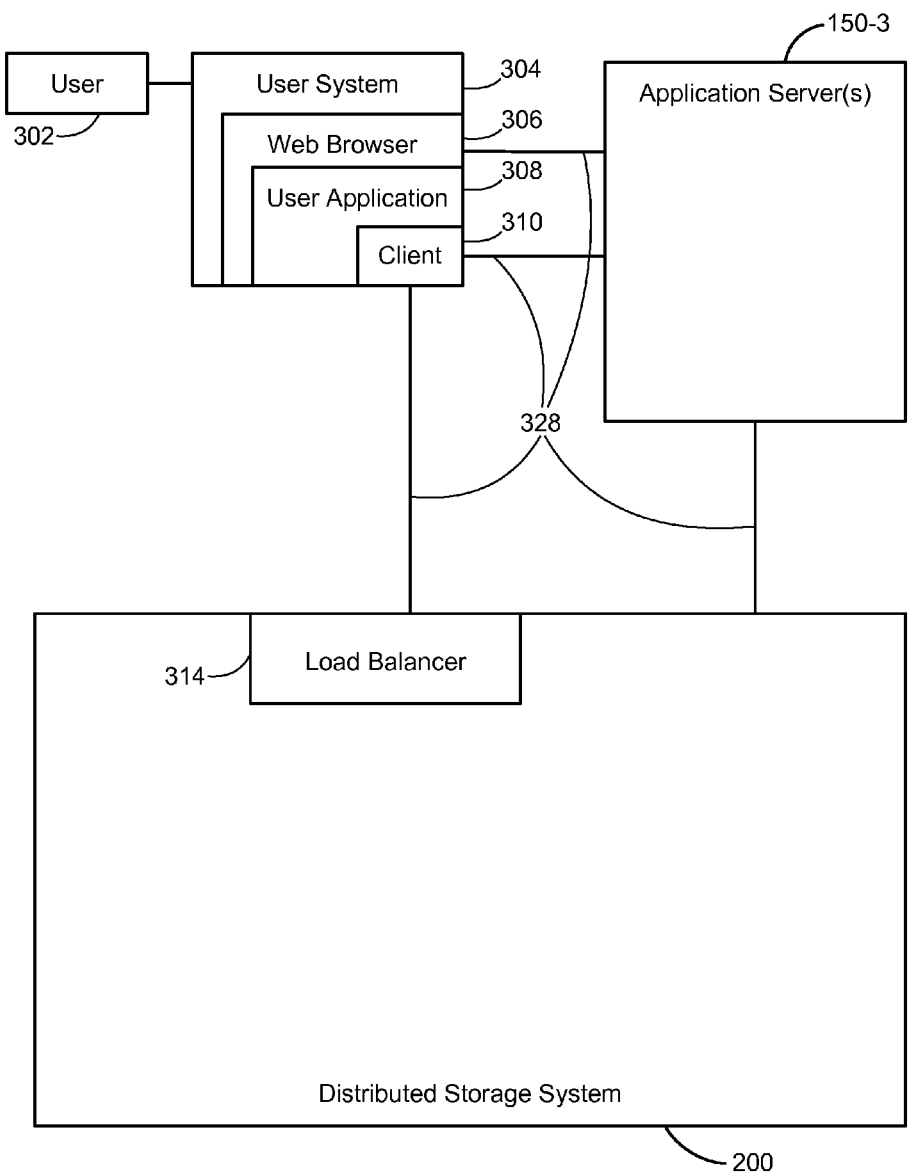

FIG. 1E illustrates an embodiment that is similar to FIG. 1C, except that the load balancer 314 is an integrated part of the distributed storage system 200. In some embodiments, load balancers 314 are included at some or all of the instances within the distributed storage system 200. Even in these embodiments, a load balancer 314 may direct the communication to a different instance.

Figure 1F:
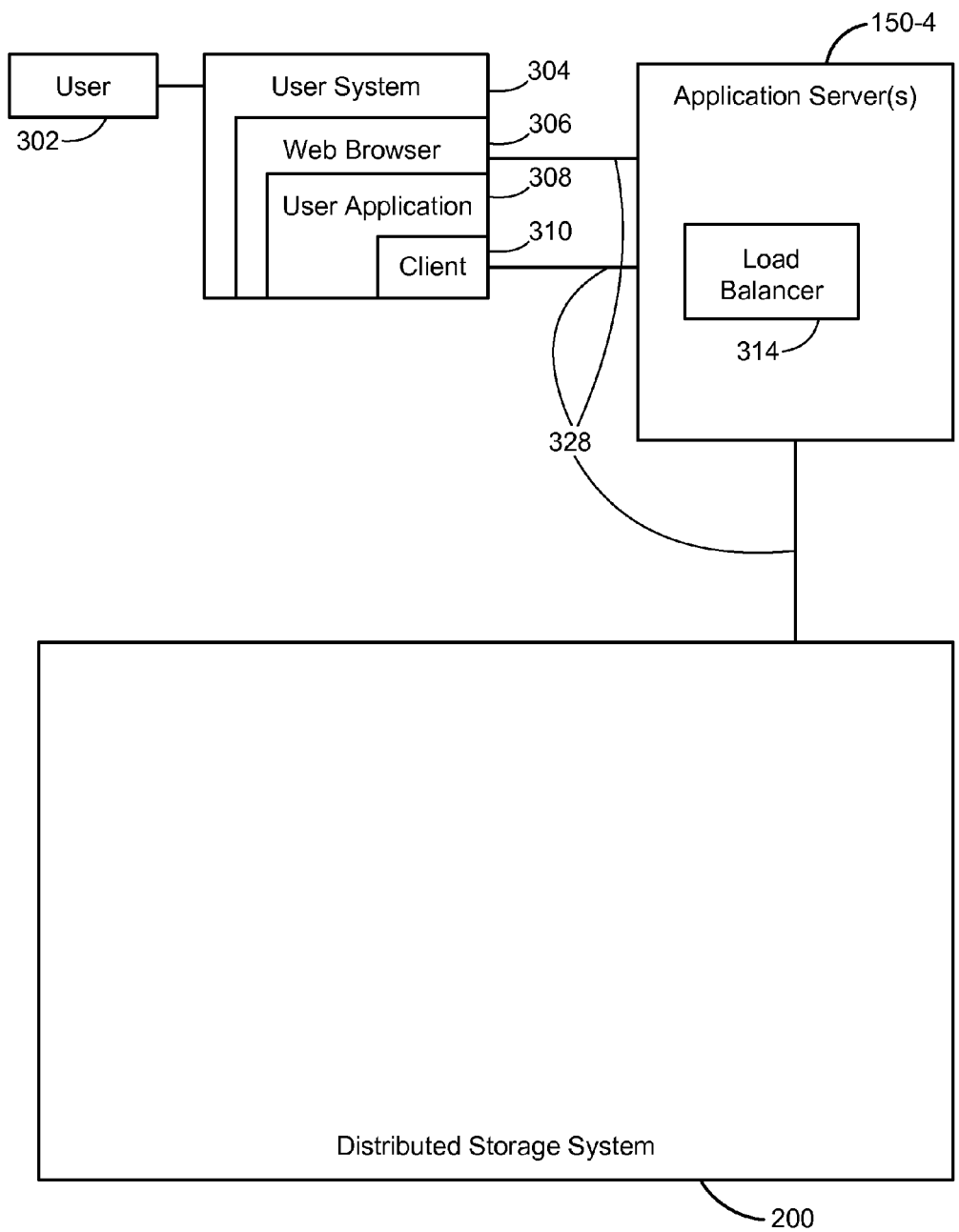

FIG. 1F illustrates an embodiment that is similar to FIG. 1C, except that the load balancer 314 is included in the application servers 150-4. This embodiment is more commonly used when the distributed storage system 200 is being used by a single user application provided by the application servers 150-4. In this case, the load balancer 314 has a complete picture of the load because the application servers 150-4 receive all of the traffic directed to the distributed storage system.

Figure 1G:
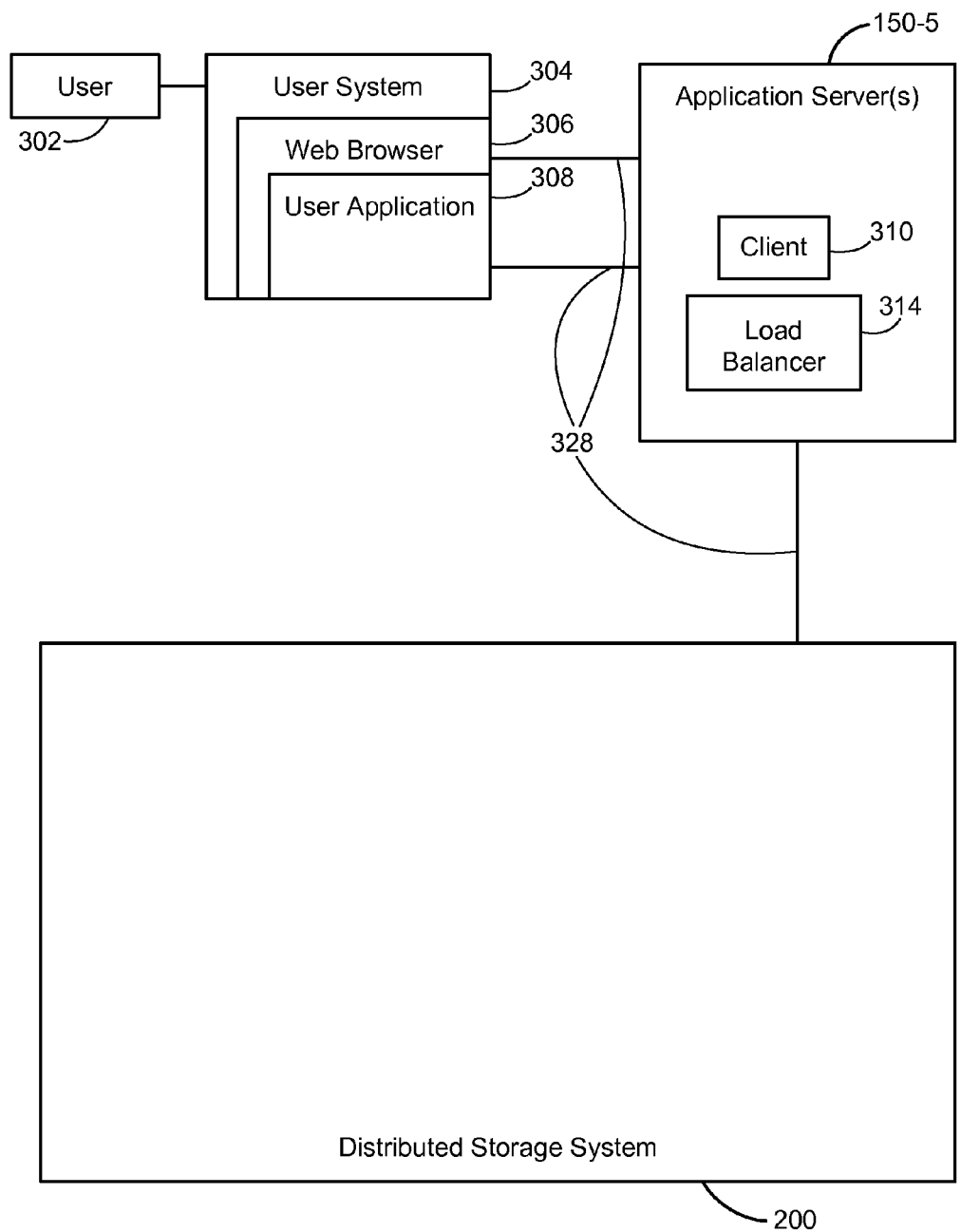

FIG. 1G illustrates a variation of FIG. 1F, in which the client library 310 is maintained at the application servers 150-5 rather than integrated within the running user application 308.

The distributed storage system 200 shown in FIGS. 2 and 3 includes certain global configuration information and applications 202, as well as a plurality of instances 102-1, . . . 102-N. In some embodiments, the global configuration information includes a list of instances and information about each instance. In some embodiments, the information for each instance includes: the set of storage nodes (data stores) at the instance; the state information, which in some embodiments includes whether the metadata at the instance is global or local; and network addresses to reach the blobmaster 204 and bitpusher 210 at the instance. In some embodiments, the global configuration information resides at a single physical location, and that information is retrieved as needed. In other embodiments, copies of the global configuration information are stored at multiple locations. In some embodiments, copies of the global configuration information are stored at some or all of the instances. In some embodiments, the global configuration information can only be modified at a single location, and changes are transferred to other locations by one-way replication. In some embodiments, there are certain global applications, such as the location assignment daemon 346 (see FIG. 3) that can only run at one location at any given time. In some embodiments, the global applications run at a selected instance, but in other embodiments, one or more of the global applications runs on a set of servers distinct from the instances. In some embodiments, the location where a global application is running is specified as part of the global configuration information, and is subject to change over time.

FIGS. 2 and 3 illustrate an exemplary set of programs, processes, and data that run or exist at each instance, as well as a user system that may access the distributed storage system 200 and some global applications and configuration. In some embodiments, a user 302 interacts with a user system 304, which may be a computer or other device that can run a web browser 306. A user application 308 runs in the web browser, and uses functionality provided by client library 310 to access data stored in the distributed storage system 200 using network 328. Network 328 may be the Internet, a local area network (LAN), a wide area network (WAN), a wireless network (WiFi), a local intranet, or any combination of these. In some embodiments, a load balancer 314 distributes the workload among the instances, so multiple requests issued by a single user system 304 need not all go to the same instance. In some embodiments, the client library 310 uses information in a global configuration store 312 to identify an appropriate instance for a request. The client uses information from the global configuration store 312 to find the set of blobmasters 204 and bitpushers 210 that are available, and where to contact them. A blobmaster 204 uses a global configuration store 312 to identify the set of peers for all of the replication processes. A bitpusher 210 uses information in a global configuration store 312 to track which stores it is responsible for. In some embodiments, user application 308 runs on the user system 304 without a web browser 306. Exemplary user applications are an email application and an online video application.

In some embodiments, each instance has a blobmaster 204, which is a program that acts as an external interface to the metadata store 206. For example, an external user application 308 can request metadata corresponding to a specified blob using client library 310. Note that a "blob" (i.e., a binary large object) is a collection of binary data (e.g., images, videos, binary files, executable code, etc.) stored as a single entity in a database. This specification uses the terms "blob" and "object" interchangeably and embodiments that refer to a "blob" may also be applied to "objects," and vice versa. In general, the term "object" may refer to a "blob" or any other object such as a database object, a file, or the like, or a portion (or subset) of the aforementioned objects. In some embodiments, every instance 102 has metadata in its metadata store 206 corresponding to every blob stored anywhere in the distributed storage system 200. In other embodiments, the instances come in two varieties: those with global metadata (for every blob in the distributed storage system 200) and those with only local metadata (only for blobs that are stored at the instance). In particular, blobs typically reside at only a small subset of the instances. The metadata store 206 includes information relevant to each of the blobs, such as which instances have copies of a blob, who has access to a blob, and what type of data store is used at each instance to store a blob. The metadata store 206 is described in greater detail in co-pending U.S. patent application Ser. No. 12/703,167, "Method and System for Efficiently Replicating Data in Non-Relational Databases," filed Feb. 9, 2010, which is incorporated herein by reference in its entirety.

When a client library 310 wants to read a blob of data, the blobmaster 204 provides one or more read tokens to the client library 310, which the client library 310 provides to a bitpusher 210 in order to gain access to the relevant blob. When a client library 310 writes data, the client library 310 writes to a bitpusher 210. The bitpusher 210 returns write tokens indicating that data has been stored, which the client library 310 then provides to the blobmaster 204, in order to attach that data to a blob. A client library 310 communicates with a bitpusher 210 over network 328, which may be the same network used to communicate with the blobmaster 204. The communication between the client library 310 and bitpushers is also subject to load balancer 314. Because of load balancing or other factors, communication with a blobmaster 204 at one instance may be followed by communication with a bitpusher 210 at a different instance. For example, the first instance may be a global instance with metadata for all of the blobs, but may not have a copy of the desired blob. The metadata for the blobs identifies which instances have copies of the desired blob, so the subsequent communication with a bitpusher 210 to read or write is at a different instance.

A bitpusher 210 copies data to and from data stores. In some embodiments, the read and write operations comprise entire blobs. In other embodiments, each blob comprises one or more chunks, and the read and write operations performed by a bitpusher are on solely on chunks. In some of these embodiments, a bitpusher deals only with chunks, and has no knowledge of blobs. In some embodiments, a bitpusher has no knowledge of the contents of the data that is read or written, and does not attempt to interpret the contents. Embodiments of a bitpusher 210 support one or more types of data store. In some embodiments, a bitpusher supports a plurality of data store types, including inline data stores 212, BigTable stores 214, file server stores 216, and tape stores 218. Some embodiments support additional other stores 220, or are designed to accommodate other types of data stores as they become available or technologically feasible.

Inline stores 212 actually use storage space 208 in the metadata store 206. Inline stores provide faster access to the data, but have limited capacity, so inline stores are generally for relatively "small" blobs. In some embodiments, inline stores are limited to blobs that are stored as a single chunk. In some embodiments, "small" means blobs that are less than 32 kilobytes. In some embodiments, "small" means blobs that are less than 1 megabyte. As storage technology facilitates greater storage capacity, even blobs that are currently considered large may be "relatively small" compared to other blobs.

BigTable stores 214 store data in BigTables located on one or more BigTable database servers 316. BigTables are described in several publicly available publications, including "Bigtable: A Distributed Storage System for Structured Data," Fay Chang et al, OSDI 2006, which is incorporated herein by reference in its entirety. In some embodiments, the BigTable stores save data on a large array of BigTable database servers 316.

File stores 216 store data on one or more file servers 318. In some embodiments, the file servers use file systems provided by computer operating systems, such as UNIX. In other embodiments, the file servers 318 implement a proprietary file system, such as the Google File System (GFS). GFS is described in multiple publicly available publications, including "The Google File System," Sanjay Ghemawat et al., SOSP'03, Oct. 19-22, 2003, which is incorporated herein by reference in its entirety. In other embodiments, the file servers 318 implement NFS (Network File System) or other publicly available file systems not implemented by a computer operating system. In some embodiments, the file system is distributed across many individual servers 318 to reduce risk of loss or unavailability of any individual computer.

Tape stores 218 store data on physical tapes 320. Unlike a tape backup, the tapes here are another form of storage. The tape stores 218 are described in greater detail in co-pending U.S. patent application Ser. No. 13/023,498 "Method and System for Providing Efficient Access to a Tape Storage System," filed Feb. 8, 2011, which is incorporated herein by reference in its entirety. In some embodiments, a Tape Master application 222 assists in reading and writing from tape. In some embodiments, there are two types of tape: those that are physically loaded in a tape device, so that the tapes can be robotically loaded; and those tapes that physically located in a vault or other offline location, and require human action to mount the tapes on a tape device. In some instances, the tapes in the latter category are referred to as deep storage or archived. In some embodiments, a large read/write buffer is used to manage reading and writing data to tape. In some embodiments, this buffer is managed by the tape master application 222. In some embodiments there are separate read buffers and write buffers. In some embodiments, a client library 310 cannot directly read or write to a copy of data that is stored on tape. In these embodiments, a client must read a copy of the data from an alternative data source, even if the data must be transmitted over a greater distance.

In some embodiments, there are additional other stores 220 that store data in other formats or using other devices or technology. In some embodiments, bitpushers 210 are designed to accommodate additional storage technologies as they become available.

Each of the data store types has specific characteristics that make them useful for certain purposes. For example, inline stores provide fast access, but use up more expensive limited space. As another example, tape storage is very inexpensive, and provides secure long-term storage, but a client cannot directly read or write to tape. In some embodiments, data is automatically stored in specific data store types based on matching the characteristics of the data to the characteristics of the data stores. In some embodiments, users 302 who create files may specify the type of data store to use. In other embodiments, the type of data store to use is determined by the user application 308 that creates the blobs of data. In some embodiments, a combination of the above selection criteria is used. In some embodiments, each blob is assigned to a blob policy 326, and the storage policy specifies storage properties. A blob policy 326 may specify the number of copies of the blob to save, in what types of data stores the blob should be saved, locations where the copies should be saved, etc. For example, a policy may specify that there should be two copies on disk (BigTable stores or File Stores), one copy on tape, and all three copies at distinct metro locations. In some embodiments, blob policies 326 are stored as part of the global configuration information and applications 202.

In some embodiments, each instance 102 has a quorum clock server 228, which comprises one or more servers with internal clocks. The order of events, including metadata deltas 608, is important, so maintenance of a consistent time clock is important. A quorum clock server regularly polls a plurality of independent clocks, and determines if they are reasonably consistent. If the clocks become inconsistent and it is unclear how to resolve the inconsistency, human intervention may be required. The resolution of an inconsistency may depend on the number of clocks used for the quorum and the nature of the inconsistency. For example, if there are five clocks, and only one is inconsistent with the other four, then the consensus of the four is almost certainly right. However, if each of the five clocks has a time that differs significantly from the others, there would be no clear resolution. It is important to note that even if the quorum clock server 228 determines that the independent clocks are consistent with each other (or with a subset of each other), the independent clocks may still be unreliable. For example, it is possible the independent clocks are skewed in the same direction (e.g., skewed to the future or past). Thus, calculating time intervals using times reported by the quorum clock server 228 may still produce incorrect behavior. The embodiments described below may be used to determine time intervals between two times reported by an unreliable clock (e.g., the clock generated by the quorum clock server 228). Techniques for determining time intervals between two times reported by an unreliable clock are described in greater detail in co-pending U.S. Provisional Patent Application Ser. No. 61/302,894, "System and Method for Determining the Age of Objects in the Presence of Unreliable Clocks," filed Feb. 9, 2010, which is incorporated herein by reference in its entirety.

In some embodiments, each instance has a replication module 224, which identifies blobs or chunks that will be replicated to other instances. In some embodiments, the replication module 224 may use one or more replication queues 226-1, 226-2, . . . . Items to be replicated are placed in a replication queue 226, and the items are replicated when resources are available. In some embodiments, items in a replication queue 226 have assigned priorities, and the highest priority items are replicated as bandwidth becomes available. There are multiple ways that items can be added to a replication queue 226. In some embodiments, items are added to replication queues 226 when blob or chunk data is created or modified. For example, if an end user 302 modifies a blob at instance 1, then the modification needs to be transmitted to all other instances that have copies of the blob. In embodiments that have priorities in the replication queues 226, replication items based on blob content changes have a relatively high priority. In some embodiments, items are added to the replication queues 226 based on a current user request for a blob that is located at a distant instance. For example, if a user in California requests a blob that exists only at an instance in India, an item may be inserted into a replication queue 226 to copy the blob from the instance in India to a local instance in California. That is, since the data has to be copied from the distant location anyway, it may be useful to save the data at a local instance. These dynamic replication requests receive the highest priority because they are responding to current user requests. The dynamic replication process is described in more detail in co-pending U.S. patent application Ser. No. 13/022,579, "Method and System for Dynamically Replicating Data within a Distributed Storage System," filed Feb. 7, 2011, incorporated herein by reference in its entirety.

In some embodiments, a background replication process creates and deletes copies of blobs based on blob policies 326 and blob access data provided by a statistics server 324. The blob policies specify how many copies of a blob are desired, where the copies should reside, and in what types of data stores the data should be saved. In some embodiments, a policy may specify additional properties, such as the number of generations of a blob to save, or time frames for saving different numbers of copies. E.g., save three copies for the first 30 days after creation, then two copies thereafter. Using blob policies 326, together with statistical information provided by the statistics server 324, a location assignment daemon 322 determines where to create new copies of a blob and what copies may be deleted. When new copies are to be created, records are inserted into a replication queue 226. In some embodiments, the location assignment daemon 322 manages replicas of objects locally for a respective instance of the distributed storage system 200. In other words, each respective instance of the distributed storage system 200 includes the location assignment daemon 322 that manages replication requests for the respective instance. In some embodiments, the location assignment daemon 322 manages replicas of objects globally for the distributed storage system 200. In other words, there is only one location assignment daemon 322 in the distributed storage system 200. The use of blob policies 326 and the operation of a location assignment daemon 322 are described in more detail below. The replication queues 226 are described in more detail in co-pending patent U.S. patent application Ser. No. 13/022,564, "System and Method for Replicating Objects in a Distributed Storage System," filed Feb. 7, 2011, which is incorporated herein by reference in its entirety.

Figure 4:
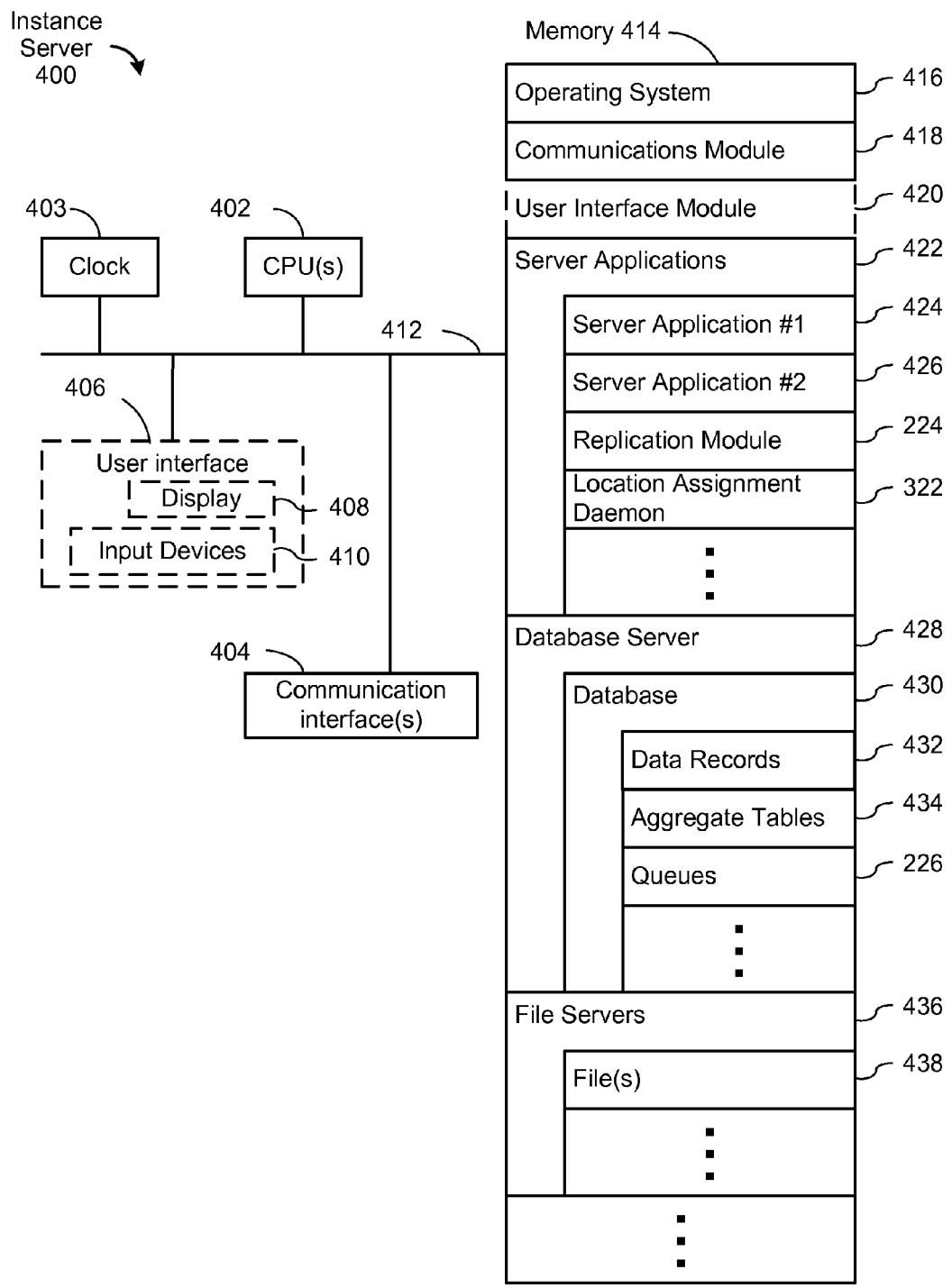
FIG. 4 is a block diagram of an instance server that may be used for the various programs and processes, according to some embodiments.

FIG. 4 is a block diagram illustrating an Instance Server 400 used for operations identified in FIGS. 2 and 3 in accordance with some embodiments of the present invention. An Instance Server 400 typically includes one or more processing units (CPU's) 402 for executing modules, a clock 403 that reports the current date and/or time, programs and/or instructions stored in memory 414 and thereby performing processing operations, one or more network or other communications interfaces 404, memory 414, and one or more communication buses 412 for interconnecting these components. In some embodiments, the clock 403 is a local clock that is periodically synchronized with a clock server (e.g., a quorum clock server 228 or any other clock server on a network, etc.). In some embodiments, an Instance Server 400 includes a user interface 406 comprising a display device 408 and one or more input devices 410. In some embodiments, memory 414 includes high-speed random access memory, such as DRAM, SRAM, DDR RAM or other random access solid state memory devices. In some embodiments, memory 414 includes non-volatile memory, such as one or more magnetic disk storage devices, optical disk storage devices, flash memory devices, or other non-volatile solid state storage devices. In some embodiments, memory 414 includes one or more storage devices remotely located from the CPU(s) 402. Memory 414, or alternately the non-volatile memory device(s) within memory 414, comprises a computer readable storage medium. In some embodiments, memory 414 or the computer readable storage medium of memory 414 stores the following programs, modules and data structures, or a subset thereof:

- an operating system 416 that includes procedures for handling various basic system services and for performing hardware dependent tasks;
- a communications module 418 that is used for connecting an Instance Server 400 to other Instance Servers or computers via the one or more communication network interfaces 404 (wired or wireless) and one or more communication networks 328, such as the Internet, other wide area networks, local area networks, metropolitan area networks, and so on;
- an optional user interface module 420 that receives commands from the user via the input devices 410 and generates user interface objects in the display device 408;
- one or more server applications 422, such as a blobmaster 204 that provides an external interface to the blob metadata; a bitpusher 210 that provides access to read and write data from data stores; a replication module 224 that copies data from one instance to another; a quorum clock server 228 that provides a stable clock; a location assignment daemon 322 that determines where copies of a blob should be located; and other server functionality as illustrated in FIGS. 2 and 3. As illustrated, two or more server applications 424 and 426 may execute on the same physical computer; and
- one or more database servers 428 that provides storage and access to one or more databases 430. The databases 430 may provide storage for metadata store 206, replication queues 226, blob policies 326, global configuration store 312, the statistics used by statistics server 324, as well as ancillary databases used by any of the other functionality. Each database 430 has one or more tables with data records 432. In some embodiments, some databases include aggregate tables 434, such as the statistics used by statistics server 324;
- one or more file servers 436 that provide access to read and write files, such as files 438. File server functionality may be provided directly by an operating system (e.g., UNIX or Linux), or by a software application, such as the Google File System (GFS).

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 414 may store a subset of the modules and data structures identified above. Furthermore, memory 414 may store additional modules or data structures not described above.

Although FIG. 4 shows an instance server used for performing various operations or storing data as illustrated in FIGS. 2 and 3, FIG. 4 is intended more as functional description of the various features which may be present in a set of one or more computers rather than as a structural schematic of the embodiments described herein. In practice, and as recognized by those of ordinary skill in the art, items shown separately could be combined and some items could be separated. For example, some items shown separately in FIG. 4 could be implemented on individual computer systems and single items could be implemented by one or more computer systems. The actual number of computers used to implement each of the operations, databases, or file storage systems, and how features are allocated among them will vary from one implementation to another, and may depend in part on the amount of data at each instance, the amount of data traffic that an instance must handle during peak usage periods, as well as the amount of data traffic that an instance must handle during average usage periods. Furthermore, for embodiments in which the location assignment daemon 322 manages replicas of objects globally for the distributed storage system 200, the location assignment daemon 322 is located on a computer system that is separate and distinct from the instance servers. The components of the computer system that includes the location assignment daemon 322 are similar to the instance server 400 with the exception that computer system may omit the server applications 424 and 426, the replication module 224, the database server 428, the file servers 436, and any combination thereof. In some embodiments, each instance of the distributed storage system 200 includes a stripped-down version of the location assignment daemon 322. The stripped-down version of the location assignment daemon 322 is used by a particular instance of the distributed storage system 200 when a new object is created. These embodiments are described in more detail below.

To provide faster responses to clients and to provide fault tolerance, each program or process that runs at an instance is generally distributed among multiple computers. The number of instance servers 400 assigned to each of the programs or processes can vary, and depends on the workload. FIG. 5 provides exemplary information about a typical number of instance servers 400 that are assigned to each of the functions. In some embodiments, each instance has about 10 instance servers performing (502) as blobmasters. In some embodiments, each instance has about 100 instance servers performing (504) as bitpushers. In some embodiments, each instance has about 50 instance servers performing (506) as BigTable servers. In some embodiments, each instance has about 1000 instance servers performing (508) as file system servers. File system servers store data for file system stores 216 as well as the underlying storage medium for BigTable stores 214. In some embodiments, each instance has about 10 instance servers performing (510) as tape servers. In some embodiments, each instance has about 5 instance servers performing (512) as tape masters. In some embodiments, each instance has about 10 instance servers performing (514) replication management, which includes both dynamic and background replication. In some embodiments, each instance has about 5 instance servers performing (516) as quorum clock servers.

Life of an Object

Figure 6A:
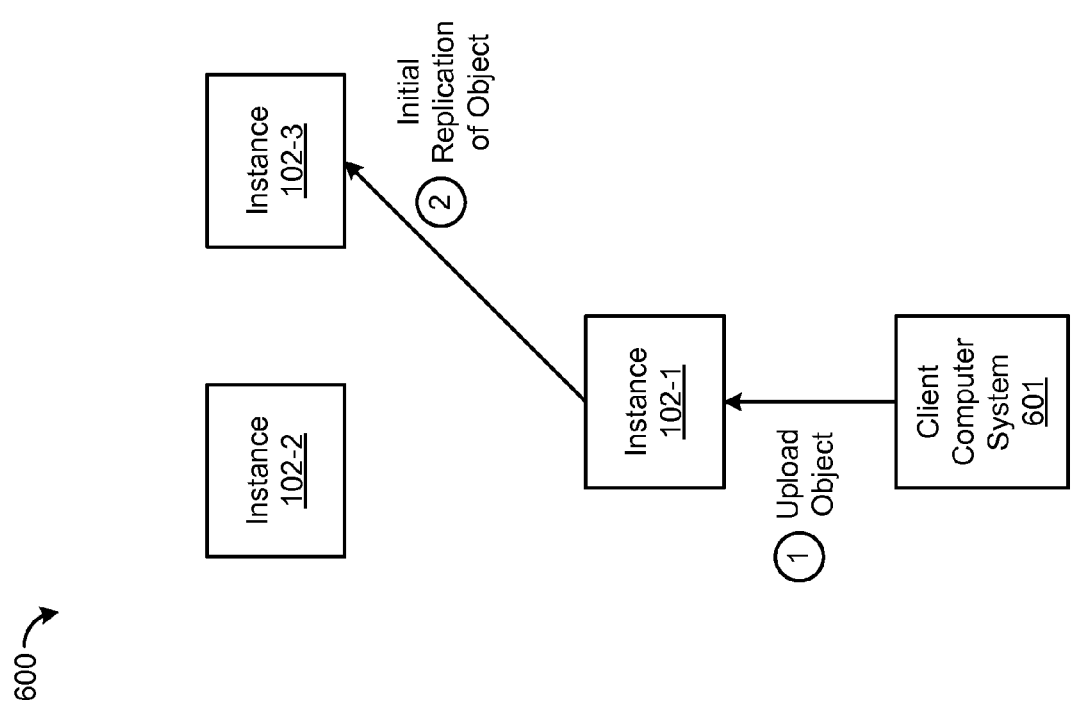
FIG. 6A is a block diagram illustrating the creation and the initial replication of an object, according to some embodiments.
Figure 6B:
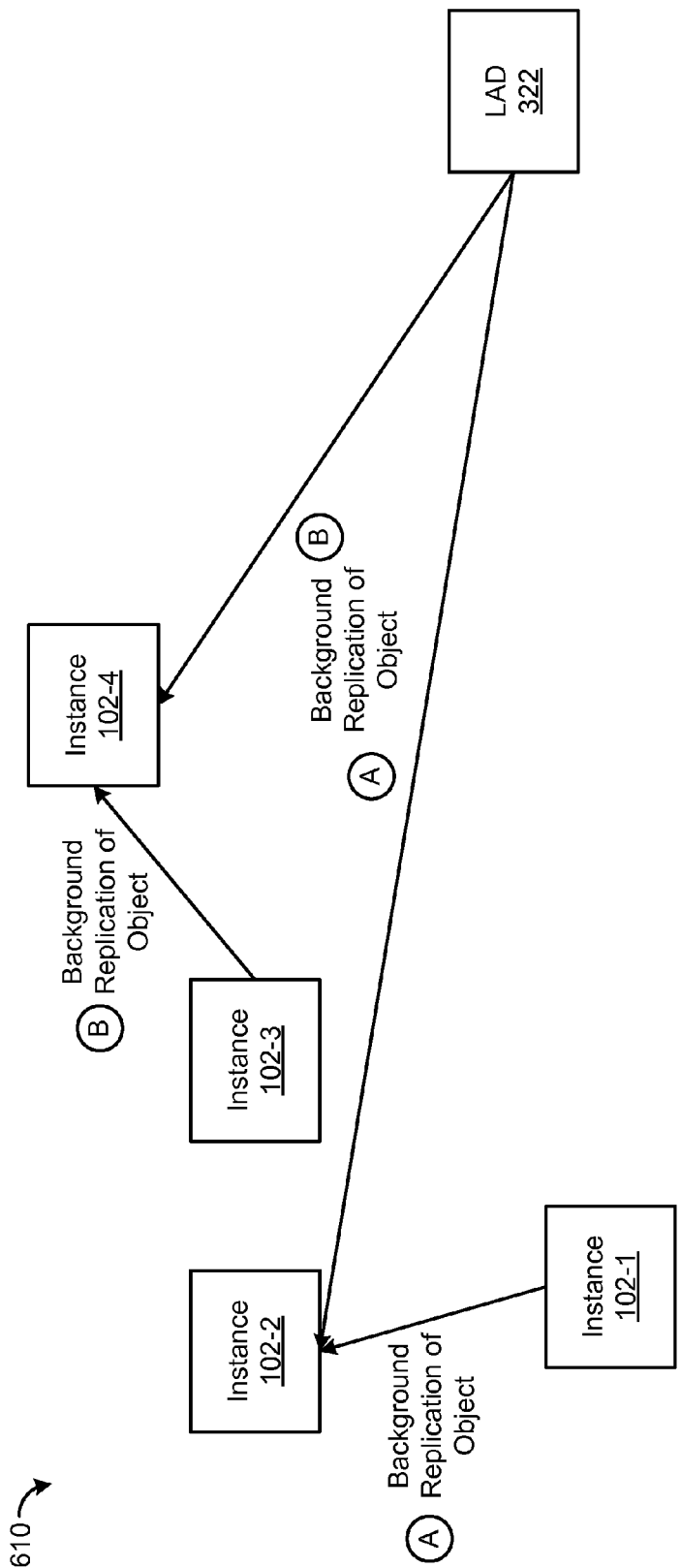
FIG. 6B is a block diagram illustrating the background replication of the object, according to some embodiments.

FIGS. 6A-6D present block diagrams 600, 610, 620, and 630 illustrating an exemplary sequence of events in the life of an exemplary object in the distributed storage system 200, according to some embodiments. In FIG. 6A, a client computer system 601 uploads (1) an object to instance 102-1 of the distributed storage system 200. In order to ensure data integrity, an initial replication of the object (2) is performed. In this example, a replica of the object is created in instance 102-3 of the distributed storage system 200.

Some time later, the location assignment daemon 322 initiates background replication (A, B) of the object based on replication policies for the object. The location assignment daemon 322 generates a replication request based on the policies for the object. The replication policies specify, among other things, a minimum and/or a maximum number of replicas of the object to be maintained in the distributed storage system 200. The replication request for the object includes a priority that is used when inserting the replication request into a replication queue 226 (i.e., a priority queue). In this example, replicas of the object are stored in instances 102-2 and 102-4 of the distributed storage system.

Figure 6C:
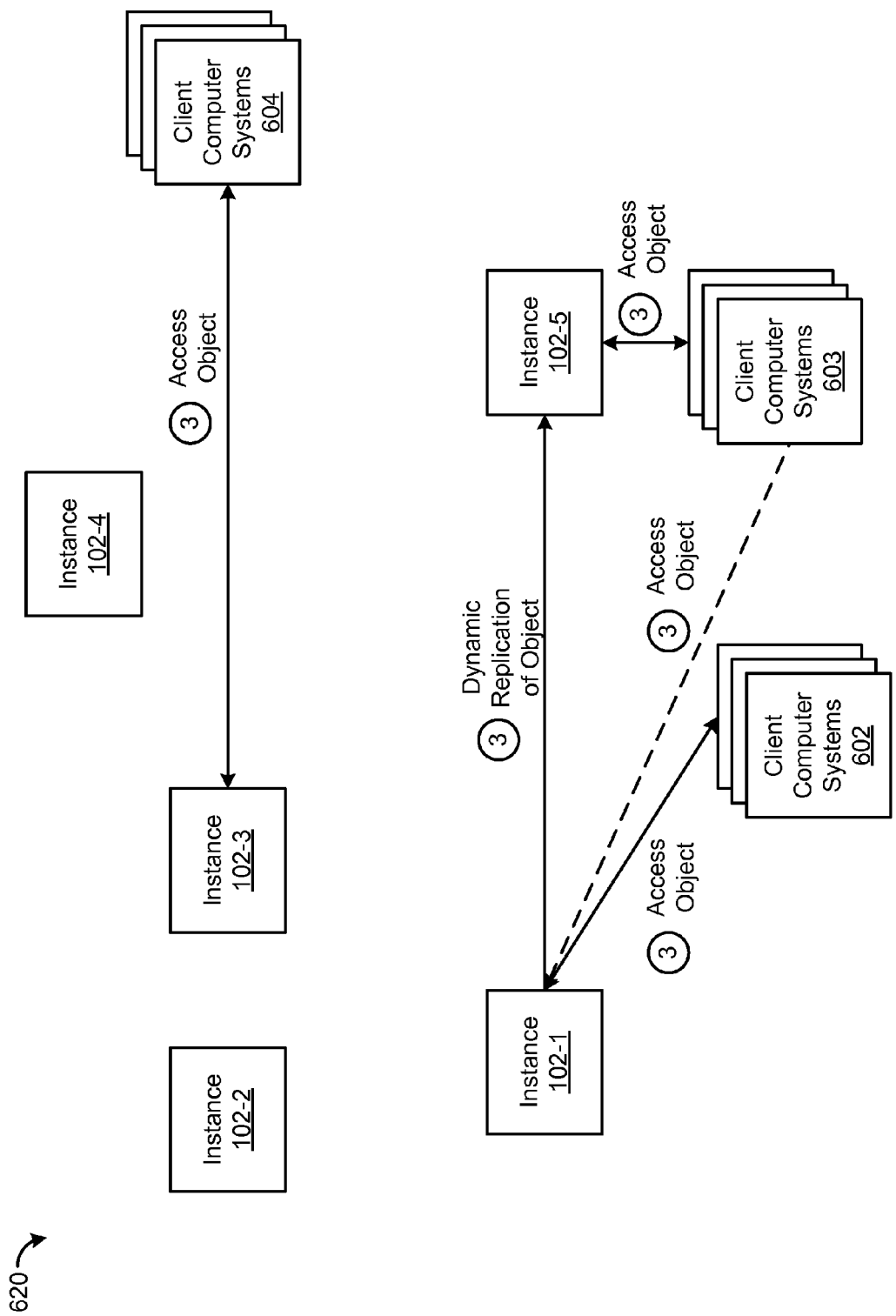
FIG. 6C is a block diagram illustrating a dynamic replication of the object, according to some embodiments.

At some point in time (either before or after the events illustrated in FIG. 6B), the object experiences a large demand. For example, client computer systems 602, 603, and 604 may request (3) access to the object. If the demand for the object exceeds the current capacity of a particular instance of the distributed storage system, a dynamic replication of the object (3) is performed in which a replica of the object is created in one or more instances. In this example, a replica of the object is created in instance 102-5 of the distributed storage system. A subset of the requests for the object are then redirected to the instance 102-5 as illustrated in FIG. 6C. Note that a dynamic replication of the object may also be performed to reduce the network latency between the client computer systems attempting to access the object and the instance at which the object is located. For example, if the replicas of the object are initially located in instances of the distributed storage system 200 within the United States, but there is a large demand for the object from Japan, replicas of the object may be created in instances of the distributed storage system 200 that located are within Japan.

Figure 6D:
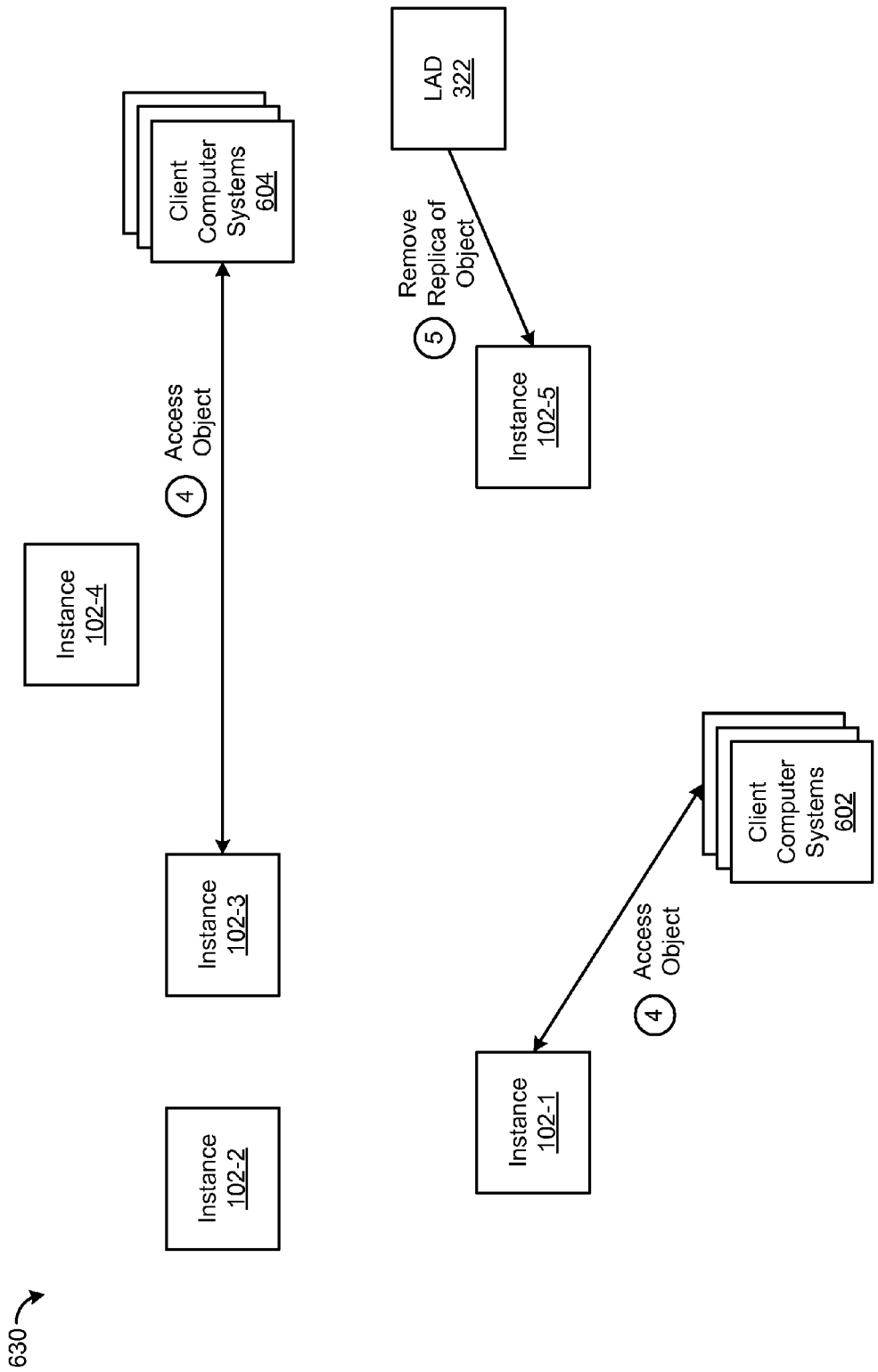
FIG. 6D is a block diagram illustrating the removal of a replica of the object, according to some embodiments.

Dynamic replication requests may increase the number of replicas of the object beyond a number allowed by the replication policies for the object. When the demand of an object decreases (e.g., only client computer systems 602 and 604 are still requesting the object), replicas of the object that exceed the replication policies for the object may be removed. In these cases, the location assignment daemon 322 removes (5) the extra replicas of the object when it has been determined that the extra replicas of the object are no longer needed (e.g., demand for the object has decreased), as illustrated in FIG. 6D.

Location Assignment Daemon and Replication Policies

In some embodiments, the location assignment daemon 322 manages replicas of objects for an instance of the distributed storage system 200. In these embodiments, in order to satisfy replication policies of an object in the distributed storage system 200, the location assignment daemon 322 generates replication requests that add replicas of the object and/or generates replica removal requests that delete replicas of the object in the distributed storage system 200.

In some embodiments, the location assignment daemon 322 generates replication requests and replica removal requests based on a cost-benefit analysis. For example, a benefit is obtained when a replica of an object whose number of replicas is below the minimum number of replicas specified in the replication policy for the object is added to the distributed storage system 200. The cost of adding a replica of an object is a storage cost, network bandwidth usage, and transaction costs (e.g., processing required by a source instance and destination instance). Similarly, a benefit is obtained when replica of an object whose number of replicas is exceeds the maximum number of replicas specified in the replication policy for the object is removed from the distributed storage system 200.

In some embodiments, the location assignment daemon 322 determines whether a replica for an object at a particular instance can be deleted. In these embodiments, the replica of the object at the instance is removed only when (1) the removal of the replica of the object does not put the number of replicas of the object below the minimum number of replicas for the object as specified in the replication policies for the object and (2) a last access time of the replica for the object at the instance is greater than a predetermined threshold. Note that the predetermined threshold may be defined by the distributed storage system, the user (i.e., application), and/or the amount of free storage space at the instance.

In some embodiments, the location assignment daemon 322 moves replicas of objects from one instance of the distributed storage system 200 to another instance of the distributed storage system 200. Again, the location assignment daemon 322 performs a cost-benefit analysis of moving the replicas of the objects, as described above.

In some embodiments, a replication policy for an object includes criteria selected from the group consisting of a minimum number of replicas of the object that must be present in the distributed storage system, a maximum number of the replicas of the object that are allowed to be present in the distributed storage system, storage device types on which the replicas of the object are to be stored, locations at which the replicas of the object may be stored, locations at which the replicas of the object may not be stored, and a range of ages for the object during which the replication policy for the object applies. For example, a first replication policy for a webmail application may specify that each object in the webmail application must have a minimum of 2 replicas and a maximum of 5 replicas, wherein the replicas of the objects can be stored in data centers outside of China, and wherein at least 1 replica of each object must be stored on tape. A second replication policy for the webmail application may also specify that for objects older than 30 days, a minimum of 1 replica and a maximum of 3 replicas are stored in the distributed storage system 200, wherein the replicas of the objects can be stored in data centers outside of China, and wherein at least 1 replica of each object must be stored on tape.

In some embodiments, the location assignment daemon 322 scans (e.g., either continuously or periodically) through the metadata for objects (e.g., the metadata may be stored in a global metadata table) in the distributed storage system 200 and generates replication requests or replica removal requests to attempt to satisfy the replication policies for the objects.

In some embodiments, when a new object is created, a stripped-down version of the location assignment daemon 322 (also referred to as "micro-LAD") is executed by the instance in which the new object was created. The micro-LAD generates high-priority replication requests to replicate the newly-created object. These high-priority replication requests ensure that the newly-created object has sufficient replicas for backup and redundancy purposes (e.g., to guard against loss of access to instances of the distributed storage system 200).

Managing Load on a Downstream Server

As discussed above, when a global workload manager (e.g., a global version of the location assignment daemon 322) does not exist in the distributed storage system, an upstream server may inadvertently overload the downstream server by issuing replication requests (transactions) to the downstream server at a rate greater than a maximum transaction rate of the downstream server. The embodiments discussed below with reference to FIGS. 7-12 address this problem. Note that the term "upstream server" is used to refer to a server that issues transactions to a downstream server. In some implementations, the upstream server includes a location assignment daemon (e.g., the location assignment daemon 322) that includes a plurality of processes (e.g., worker processes) that issues transactions to downstream servers. In these implementations, the transactions issued by the location assignment daemon may be based at least in part on object policies (e.g., blob policies 326).

Figure 7:
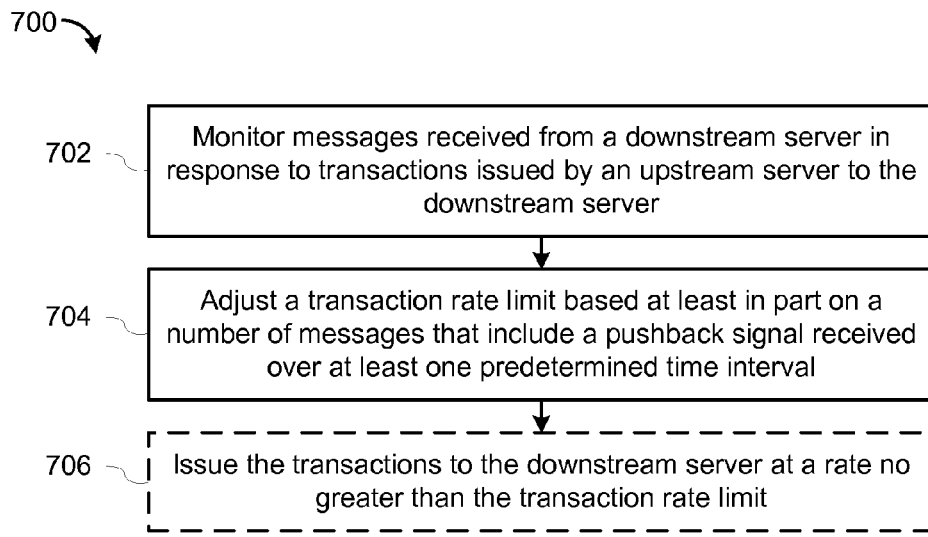
FIG. 7 is a flowchart of a method for managing load on a downstream server in a distributed storage system, according to some embodiments.

FIG. 7 is a flowchart of a method 700 for managing load on a downstream server in a distributed storage system, according to some embodiments. The upstream server monitors (702) messages received from the downstream server in response to transactions issued by the upstream server to the downstream server. In some embodiments, the transactions are issued to the downstream server at a rate no greater than a transaction rate limit (L) which is based at least in part on a maximum transaction processing rate (MaxL) of the downstream server. For example, if the maximum transaction processing rate of the downstream server is 100 transactions per second, the transaction rate limit is less than or equal to 100 transactions per second.

Figure 11:
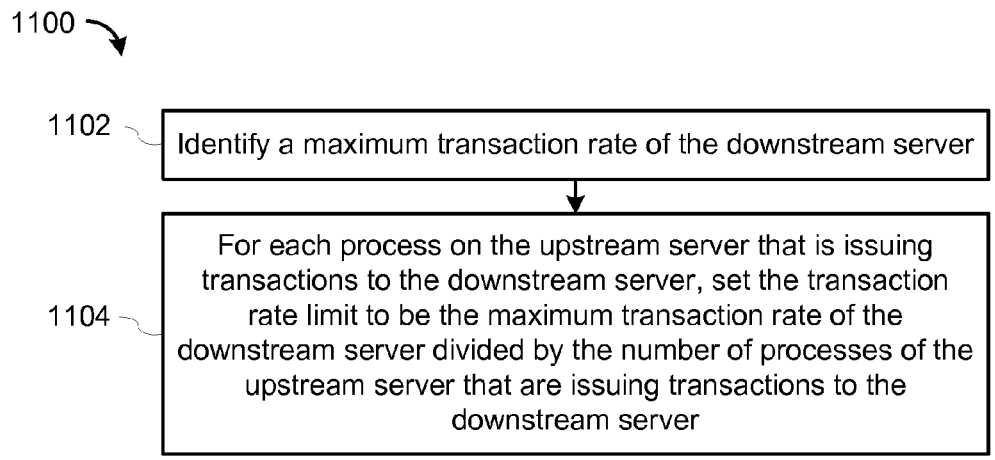
FIG. 11 is a flowchart of a method for setting an initial value of the transaction rate limit, according to some embodiments.

In some embodiments, the upstream server determines an initial value for the transaction rate limit (MinL) and adjusts the initial value of the transaction rate limit as discussed below with reference to operation 704. FIG. 11 is a flowchart of a method 1100 for setting an initial value of the transaction rate limit, according to some embodiments. The upstream server identifies (1102) a maximum transaction rate of the downstream server (i.e., MaxL). Continuing the example from above, the maximum transaction processing rate of the downstream server is 100 transactions per second.

For each process on the upstream server that is issuing transactions to the downstream server, the upstream server sets (1104) the transaction rate limit to be the maximum transaction rate of the downstream server divided by the number of processes of the upstream server that are issuing transactions to the downstream server. For example, if 5 processes of the upstream server are issuing transactions to the downstream server, the transaction rate limit is 20 (100 transactions per second/5 processes).

Returning to FIG. 7, the upstream server adjusts (704) the transaction rate limit based at least in part on a number of messages that include a pushback signal received over at least one predetermined time interval, where the pushback signal indicates that a utilization rate of the downstream server has exceeded a predetermined utilization rate (PT). The adjustment of the transaction rate limit may be based on an absolute number of messages that include a pushback signal, a percentage of messages that include a pushback signal, and/or any function of the number of messages that include a pushback signal. Operation 704 is described in more detail below with reference to FIG. 8.

In some embodiments, after adjusting (704) the transaction rate limit, the upstream server issues (706) the transactions to the downstream server at a rate no greater than the transaction rate limit (i.e., the adjusted transaction rate limit).

In some embodiments, the operations illustrated in FIG. 7 are repeated, where a subsequent adjustment of the transaction rate limit occurs at a random time within a predetermined adjustment time interval, and where the predetermined adjustment time interval starts a predetermined adjustment time period (AI) after a time when a prior adjustment of the transaction rate limit has occurred. For example, the predetermined adjustment time interval may be bounded by a time AI after the time when the prior adjustment of the transaction rate limit occurred and a time AI*AIR after the time when the prior adjustment of the transaction rate limit occurred, where AIR is a number greater than 1. In this example, the subsequent adjustment of the transaction rate limit occurs at a random time between AI and AI*AIR after the time when the prior adjustment of the transaction rate limit occurred.

In some embodiments, a respective transaction includes a replication request to replicate at least one object. For example, the replication request may include a request to create (e.g., copy), modify, and/or delete an object in the distributed storage system.

Figure 8:
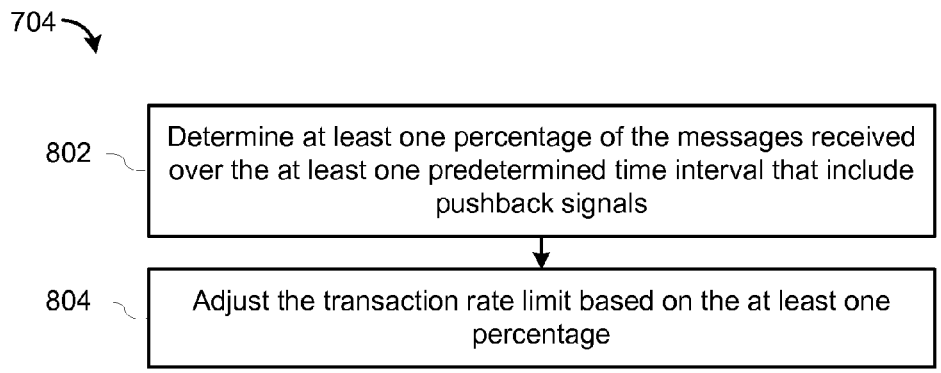
FIG. 8 is a flowchart of a method for adjusting a transaction rate limit, according to some embodiments.

FIG. 8 is a flowchart of a method for adjusting (704) a transaction rate limit, according to some embodiments. The upstream server determines (802) at least one percentage of the messages received over the at least one predetermined time interval that include pushback signals and adjusts (804) the transaction rate limit based on the at least one percentage. Operation 804 is described in more detail below with reference to FIGS. 9 and 10.

Figure 9:
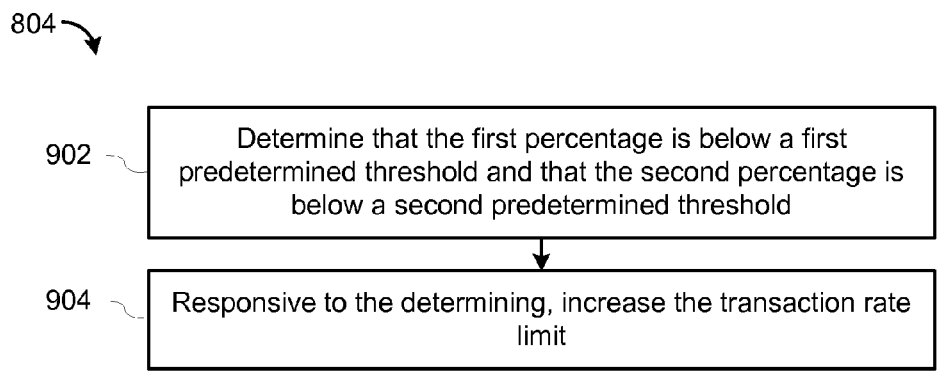
FIG. 9 is a flowchart of a method for adjusting a transaction rate limit based on at least one percentage, according to some embodiments.

FIG. 9 is a flowchart of a method for adjusting (804) a transaction rate limit based on at least one percentage, according to some embodiments. In some embodiments, the at least one percentage includes a first percentage of the messages received over a first predetermined time interval that include the pushback signal and a second percentage of the messages over a second predetermined time interval that include the pushback signal. For example, the first predetermined time interval may be a short-term time interval (STI) and the first percentage of the messages received over the time interval STI that include the pushback signal is a short-term pushback average (STPA). The second predetermined time interval may be a long-term time interval (LTI) and the second percentage of the messages received over the time interval LTI that include the pushback signal is a long-term pushback average (LTPA).

In FIG. 9, the upstream server determines (902) that the first percentage is below a first predetermined threshold and that the second percentage is below a second predetermined threshold. For example, assuming that the first predetermined threshold is a low watermark percentage (LWMP) and the second predetermined threshold is a high watermark percentage (HWMP), the upstream server may determine that STPA<LWMP and LTPA<LWMP.

Responsive to the determining, the upstream server increases (904) the transaction rate limit. In some embodiments, the upstream server increases the transaction rate limit based on a function of a transaction rate increase factor (IF). For example, the upstream server may set L=min (L*IF, MaxL).

In some embodiments, the transaction rate limit is only increased if a predetermined time period (e.g., MII—a minimum time interval between two consecutive increases in the transaction rate limit) has elapsed since a prior increase to the transaction rate limit.

Figure 10:
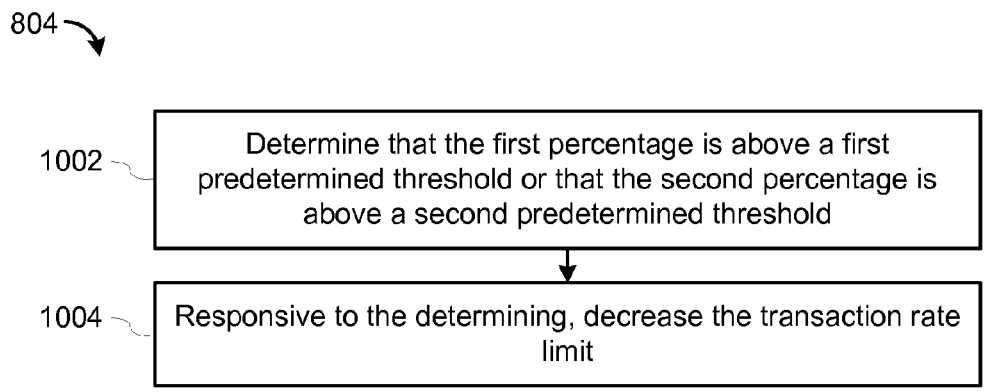
FIG. 10 is a flowchart of another method for adjusting a transaction rate limit based on at least one percentage, according to some embodiments.

FIG. 10 is a flowchart of another method for adjusting (804) a transaction rate limit based on at least one percentage, according to some embodiments. In some embodiments, the at least one percentage includes a first percentage of the messages received over a first predetermined time interval that include the pushback signal and a second percentage of the messages over a second predetermined time interval that include the pushback signal. Again, the first predetermined time interval may be a short-term time interval (STI) and the first percentage of the messages received over the time interval STI that include the pushback signal is a short-term pushback average (STPA). The second predetermined time interval may be a long-term time interval (LTI) and the second percentage of the messages received over the time interval LTI that include the pushback signal is a long-term pushback average (LTPA).

In FIG. 10, the upstream server determines (1002) that the first percentage is above a first predetermined threshold or that the second percentage is above a second predetermined threshold. For example, the upstream server may determine that STPA>HWMP or LTPA>HWMP.

Responsive to the determining, the upstream server decreases (1004) the transaction rate limit. In some embodiments, the upstream server decreases the transaction rate limit based on a function of a transaction rate decrease factor (DF). For example, the upstream server may set L=max(L*DF, MinL).

Figure 12:
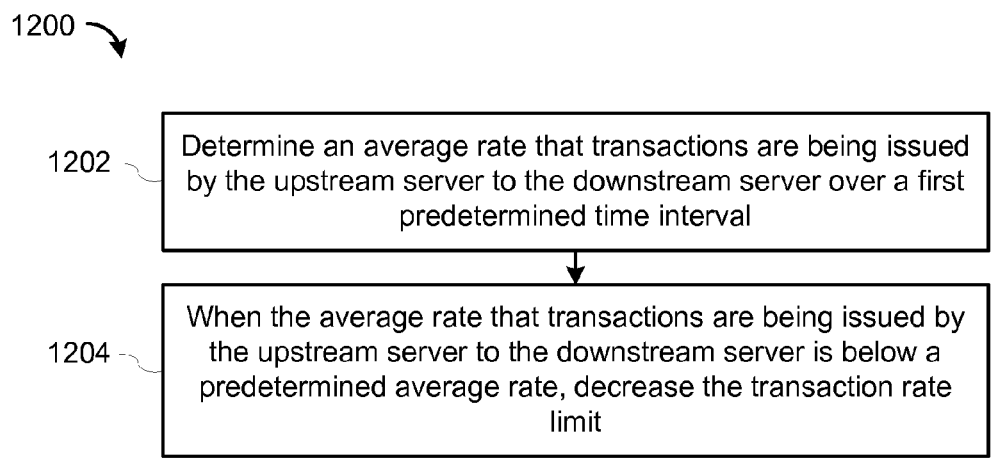
FIG. 12 is a flowchart of a method for adjusting a transaction rate limit based on an average rate that transactions are being issued by an upstream server, according to some embodiments.

In addition to adjusting the transaction rate limit as described above, in some embodiments, the upstream server adjusts the transaction rate limit based on an average rate that transactions are being issued by the upstream server. FIG. 12 is a flowchart of a method 1200 for adjusting a transaction rate limit based on an average rate that transactions are being issued by an upstream server (ATPS), according to some embodiments. The upstream server determines (1202) an average rate that transactions are being issued by the upstream server to the downstream server over a first predetermined time interval. When the average rate that transactions are being issued by the upstream server to the downstream server is below a predetermined average rate, the upstream server decreases (1204) the transaction rate limit. For example, assuming that the predetermined average rate is L*DF, when ATPS<L*DF, the upstream server sets L=max (ATPS/DF, MinL).

An example of the processes described above is provided below.

Assume that the downstream server can handle 100 transaction per second and that five processes of the upstream server that are issuing transactions to the downstream server. Three of the five processes can issue 10 transactions per second each to the downstream server and the remaining two processes can issue 50 queries per second to the downstream server. Furthermore, assume that PT=90%, AI=1 s, AIR=1.2, STI=1 s, LTI=10 s, IF=1.2, DF=0.8, MII=5 s, LWNP=0.1%, and HWMP=1%.

The initial value of the transaction rate limit is set to 20 transactions per second (100 transactions per second/5 processes). Thus, all five processes of the upstream server may issue transactions to the downstream server at a rate no greater than 20 transactions per second. This transaction rate limit only affects the two processes that can issue 50 queries per second to the downstream server.

Based on the initial value of the transaction rate limit, the combined load on the downstream server is 10+10+10+20+20=70 transactions per second. Thus, the utilization rate is 70% (70/100). Since the utilization rate is below PT (i.e., 70%<90%), no pushback signals are sent from the downstream server to the upstream server. Accordingly, at the next scheduled adjustment time interval, the upstream server increases the transaction rate limit to 24 (i.e., min(L*IF, MaxL)=min(20*1.2, 100)=24).

After the first adjustment of the transaction rate limit, the combined load is 10+10+10+24+24=78 transactions per second. Thus, the utilization rate is now 78% (78/100). Since the utilization rate is below PT (i.e., 78%<90%), no pushback signals are sent from the downstream server to the upstream server. Accordingly, at the next scheduled adjustment time interval, the upstream server increases the transaction rate limit to 28 (i.e., min(L*IF, MaxL)=min(24*1.2, 100)=29, rounded to the nearest integer).

After the second adjustment, the combined load is now 10+10+10+29+29=88 transactions per second. Thus, the utilization rate is now 88% (88/100). Since the utilization rate is below PT (i.e., 88%<90%), no pushback signals are sent from the downstream server to the upstream server. Accordingly, at the next scheduled adjustment time interval, the upstream server increases the transaction rate limit to 34 (i.e., min (L*IF, MaxL)=min(28*1.2, 100)=34, rounded to the nearest integer).

After the third adjustment, the combined load is now 10+10+10+34+34=98 transactions per second. Thus, the utilization rate is now 98% (98/100). Since the utilization rate is above PT (i.e., 98%>90%), pushback signals are sent from the downstream server to the upstream server. Accordingly, at the next scheduled adjustment time interval, the upstream server decreases the transaction rate limit to 27 (i.e., min (L*IF, MaxL)=min(34*0.8, 100)=27, rounded to the nearest integer).

After the fourth adjustment, the combined load is now 10+10+10+27+27=84 transactions per second. Thus, the utilization rate is now 84% (84/100). Since the utilization rate is below PT (i.e., 84%<90%), no pushback signals are sent from the downstream server to the upstream server. Accordingly, at the next scheduled adjustment time interval, the upstream server increases the transaction rate limit to 27 (i.e., min (L*IF, MaxL)=min(34*0.8, 100)=27, rounded to the nearest integer).

The process continues as discussed above.

In summary, the embodiments described herein allow the upstream server of the upstream server to issue transactions to the downstream server without having knowledge of the actual load of the downstream server. The downstream server transmits messages including the pushback signal to the upstream server, which in turn makes adjustments to the rate at which the upstream server issues transactions to the downstream server, as described above. The embodiments described herein may also be used when multiple upstream servers are issuing transactions to the same downstream server. In this case, the downstream server transmits messages including the pushback signal to all upstream servers that are issuing transactions to the downstream servers. In response to receiving the messages, each respective upstream server adjusts its own rate at which the respective upstream server issues transactions to the downstream server.

The methods illustrated in FIGS. 7-12 may be governed by instructions that are stored in a computer readable storage medium and that are executed by at least one processor of at least one server. Each of the operations shown in FIGS. 7-12 may correspond to instructions stored in a non-transitory computer memory or computer readable storage medium. In various implementations, the non-transitory computer readable storage medium includes a magnetic or optical disk storage device, solid state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A computer-implemented method for managing load in a distributed storage system, comprising:
    at a first instance server in the distributed storage system, the first instance server having memory and at least one processor coupled to the memory:
        obtaining a transaction rate limit associated with a second instance server;
        issuing a plurality of replication transactions to the second instance server, each replication transaction of the plurality of replication transactions being issued in accordance with a respective object replication policy, wherein the plurality of replication transactions are issued at a rate no greater than the transaction rate limit;

monitoring messages received from the second instance server in response to the plurality of replication transactions; and adjusting the transaction rate limit based at least in part on a subset of the messages that include a pushback signal received over at least one predetermined time interval, the pushback signal indicating that a utilization rate of the second instance server has exceeded a predetermined utilization rate;

wherein adjusting the transaction rate limit includes:
determining at least one percentage of the messages received over the at least one predetermined time interval that include pushback signals; and
adjusting the transaction rate limit based on the at least one percentage.

2. The computer-implemented method of claim 1, wherein the at least one percentage includes a first percentage of the messages received over a first predetermined time interval that include the pushback signal and a second percentage of the messages over a second predetermined time interval that include the pushback signal, wherein adjusting the transaction rate limit based on the at least one percentage includes:
determining that the first percentage is below a first predetermined threshold and that the second percentage is below a second predetermined threshold; and
responsive to the determining, increasing the transaction rate limit.

3. The computer-implemented method of claim 2, wherein the transaction rate limit is only increased if a predetermined time period has elapsed since a prior increase to the transaction rate limit.

4. The computer-implemented method of claim 1, wherein the at least one percentage includes a first percentage of the messages received over a first predetermined time interval that include the pushback signal and a second percentage of the messages over a second predetermined time interval that include the pushback signal, wherein adjusting the transaction rate limit based on the at least one percentage includes:
determining that the first percentage is above a first predetermined threshold or that the second percentage is above a second predetermined threshold; and
responsive to the determining, decreasing the transaction rate limit.

5. The computer-implemented method of claim 1, wherein the first instance server includes a number of processes that are issuing replication transactions to the second instance server, and wherein prior to issuing the plurality of replication transaction to the second instance server, the method includes:
identifying a maximum transaction rate of the second instance server; and
for each process on the first instance server that is issuing replication transactions to the second instance server, setting the transaction rate limit to be the maximum transaction rate of the second instance server divided by the number of processes of the first instance server that are issuing replication transactions to the second instance server.

6. The computer-implemented method of claim 1, further comprising repeating the operations of claim 1, wherein a subsequent adjustment of the transaction rate limit occurs at a random time within a predetermined adjustment time interval, and wherein the predetermined adjustment time interval starts a predetermined adjustment time period after a time when a prior adjustment of the transaction rate limit has occurred.

7. The computer-implemented method of claim 1, further comprising:
determining an average rate that replication transactions are being issued by the first instance server to the second instance server over a first predetermined time interval; and
when the average rate that transactions are being issued by the first instance server to the second instance server is below a predetermined average rate, decreasing the transaction rate limit.

8. The computer-implemented method of claim 1, wherein a respective object replication policy corresponds to an object to be stored by a particular replication transaction and the respective object replication policy specifies at least one of:
the number of object replications to be stored;
the type of data stores to be used for storage of the object replications; and
locations within the distributed storage system where the object replications are to be stored.

9. The computer-implemented method of claim 1, wherein the respective object replication policies are each stored in a global configuration file for the distributed storage system.

10. A distributed storage system, comprising:
a plurality of instance servers communicatively coupled to one another, each instance server of the plurality of instance servers including one or more respective processors coupled to memory, the plurality of instance servers including a first instance server and a second instance server;
the first instance server configured to:
obtain a transaction rate limit associated with the second instance server;
issue a plurality of replication transactions to the second instance server, each replication transaction of the plurality of replication transactions issued in accordance with a respective object replication policy for the particular replication transaction, wherein the plurality of replication transactions are issued at a rate no greater than the transaction rate limit;
monitor messages received from the second instance server in response to the plurality of replication transactions; and
adjust the transaction rate limit based at least in part on a subset of the messages that include a pushback signal received over at least one predetermined time interval, the pushback signal indicating that a utilization rate of the second instance server has exceeded a predetermined utilization rate;
wherein adjusting the transaction rate limit includes:
determining at least one percentage of the messages received over the at least one predetermined time interval that include pushback signals; and
adjusting the transaction rate limit based on the at least one percentage.

11. The distributed storage system of claim 10, wherein the at least one percentage includes a first percentage of the messages received over a first predetermined time interval that include the pushback signal and a second percentage of the messages over a second predetermined time interval that include the pushback signal, wherein adjusting the transaction rate limit based on the at least one percentage includes:

determining that the first percentage is below a first predetermined threshold and that the second percentage is below a second predetermined threshold; and responsive to the determining, increasing the transaction rate limit.

12. The distributed storage system of claim 11, wherein the transaction rate limit is only increased if a predetermined time period has elapsed since a prior increase to the transaction rate limit.

13. The distributed storage system of claim 10, wherein the at least one percentage includes a first percentage of the messages received over a first predetermined time interval that include the pushback signal and a second percentage of the messages over a second predetermined time interval that include the pushback signal, wherein adjusting the transaction rate limit based on the at least one percentage includes:

determining that the first percentage is above a first predetermined threshold or that the second percentage is above a second predetermined threshold; and responsive to the determining, decreasing the transaction rate limit.

14. The distributed storage system of claim 10, wherein the first instance server includes a number of processes that are issuing replication transactions to the second instance server, and wherein the first instance server is further configured to, prior to issuing the plurality of replication transaction to the second instance server:

identify a maximum transaction rate of the second instance server; and for each process on the first instance server that is issuing transactions to the second instance server, set the transaction rate limit to be the maximum transaction rate of the second instance server divided by the number of processes of the first instance server that are issuing transactions to the second instance server.

15. The distributed storage system of claim 10, wherein the first instance server is further configured to repeat the issuing, monitoring, and adjusting of claim 10, wherein a subsequent adjustment of the transaction rate limit occurs at a random time within a predetermined adjustment time interval, and wherein the predetermined adjustment time interval starts a predetermined adjustment time period after a time when a prior adjustment of the transaction rate limit has occurred.

16. The distributed storage system of claim 10, the first instance server further configured to:

determine an average rate that replication transactions are being issued by the first instance server to the second instance server over a first predetermined time interval; and when the average rate that transactions are being issued by the first instance server to the second instance server is below a predetermined average rate, decrease the transaction rate limit.

17. The distributed storage system of claim 10, wherein a respective object replication policy corresponds to an object to be stored by a particular replication transaction and the respective object replication policy specifies at least one of:

the number of object replications to be stored;

the type of data stores to be used for storage of the object replications; and locations within the distributed storage system where the object replications are to be stored.

18. The distributed storage system of claim 10, wherein the system includes a global configuration file and the global configuration file includes each respective object replication policy.

19. A non-transitory computer readable storage medium storing at least one program configured for execution by at least one processor of a first instance server within a distributed storage system, the at least one program comprising instructions to:

obtain a transaction rate limit associated with a second instance server;

issue a plurality of replication transactions to the second instance server within the distributed storage system, each replication transaction of the plurality of replication transactions issued in accordance with a respective object replication policy for the particular replication transaction, wherein the plurality of replication transactions are issued at a rate no greater than the transaction rate limit;

monitor messages received from the second instance server in response to the plurality of replication transactions; and adjust the transaction rate limit based at least in part on a subset of the messages that include a pushback signal received over at least one predetermined time interval, the pushback signal indicating that a utilization rate of the second instance server has exceeded a predetermined utilization rate;

wherein adjusting the transaction rate limit includes:

determining at least one percentage of the messages received over the at least one predetermined time interval that include pushback signals; and adjusting the transaction rate limit based on the at least one percentage.

20. The non-transitory computer readable storage medium of claim 19, wherein the at least one percentage includes a first percentage of the messages received over a first predetermined time interval that include the pushback signal and a second percentage of the messages over a second predetermined time interval that include the pushback signal, wherein adjusting the transaction rate limit based on the at least one percentage includes:

determining that the first percentage is above a first predetermined threshold or that the second percentage is above a second predetermined threshold; and responsive to the determining, decreasing the transaction rate limit.

21. The non-transitory computer readable storage medium of claim 19, the at least one program further comprising instructions to:

determine an average rate that replication transactions are being issued by the first instance server to the second instance server over a first predetermined time interval; and when the average rate that transactions are being issued by the first instance server to the second instance server is below a predetermined average rate, decrease the transaction rate limit.

* * * * *